(12) United States Patent
Deshpande et al.

(10) Patent No.: US 8,811,349 B2
(45) Date of Patent: Aug. 19, 2014

(54) WIRELESS NODE SEARCH PROCEDURE

(75) Inventors: Manoj M. Deshpande, San Diego, CA (US); Anup Kuzhiyil, San Diego, CA (US); Srinivasan Balasubramanian, San Diego, CA (US); Luiza Timariu, San Diego, CA (US); Sanjiv Nanda, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 623 days.

(21) Appl. No.: 12/033,844

(22) Filed: Feb. 19, 2008

(65) Prior Publication Data

US 2008/0198811 A1    Aug. 21, 2008

Related U.S. Application Data

(60) Provisional application No. 60/891,814, filed on Feb. 21, 2007.

(51) Int. Cl.
    *H04W 76/02* (2009.01)
(52) U.S. Cl.
    USPC .......................................... 370/332; 370/351
(58) Field of Classification Search
    CPC .................................................. H04W 48/02
    USPC .................... 370/332, 338; 455/432.1, 436
    See application file for complete search history.

(56) References Cited

U.S. PATENT DOCUMENTS

| | | | | |
|---|---|---|---|---|
| 6,144,855 | A * | 11/2000 | Slovin ......................... | 455/432.1 |
| 7,848,751 | B2 * | 12/2010 | Clark et al. ................. | 455/435.1 |
| 2004/0176145 | A1 * | 9/2004 | Lee et al. ...................... | 455/572 |
| 2005/0072503 | A1 | 4/2005 | Smith et al. | |
| 2005/0096053 | A1 | 5/2005 | Liu et al. | |
| 2005/0143072 | A1 | 6/2005 | Yoon et al. | |
| 2006/0221901 | A1 | 10/2006 | Yaqub et al. | |
| 2007/0021126 | A1 * | 1/2007 | Nanda et al. ............... | 455/456.1 |
| 2008/0108346 | A1 | 5/2008 | Umatt et al. | |

FOREIGN PATENT DOCUMENTS

| | | |
|---|---|---|
| EP | 1061752 A1 | 12/2000 |
| EP | 1113690 | 7/2001 |
| EP | 1732266 A1 | 12/2006 |
| JP | 2000209630 A | 7/2000 |
| JP | 2005124215 A | 5/2005 |
| JP | 2006217178 A | 8/2006 |
| JP | 2007027877 A | 2/2007 |
| WO | WO9512932 | 5/1995 |

OTHER PUBLICATIONS

International Search Report and Written Opinion—PCT/US2008/054626, International Search Authority—European Patent Office—Apr. 11, 2008.
Taiwan Search Report—TW097106178—TIPO—Mar. 22, 2012.

* cited by examiner

*Primary Examiner* — Yemane Mesfin
*Assistant Examiner* — Henry Baron
(74) *Attorney, Agent, or Firm* — Abdollah Katbab

(57) ABSTRACT

An access terminal scans for nearby access points and maintains a candidate list of access point with which the access terminal may associate in the event the access terminal's communication with its current access point deteriorates for some reason. This search procedure may be performed in a proactive manner whereby the access terminal repeatedly performs scans and updates its list of candidate access points when it is powered on. In some aspects, the search procedure used by the access terminal may be based on a state of the wireless device. In addition, different states of the access terminal may be associated with different optimization criteria.

96 Claims, 11 Drawing Sheets

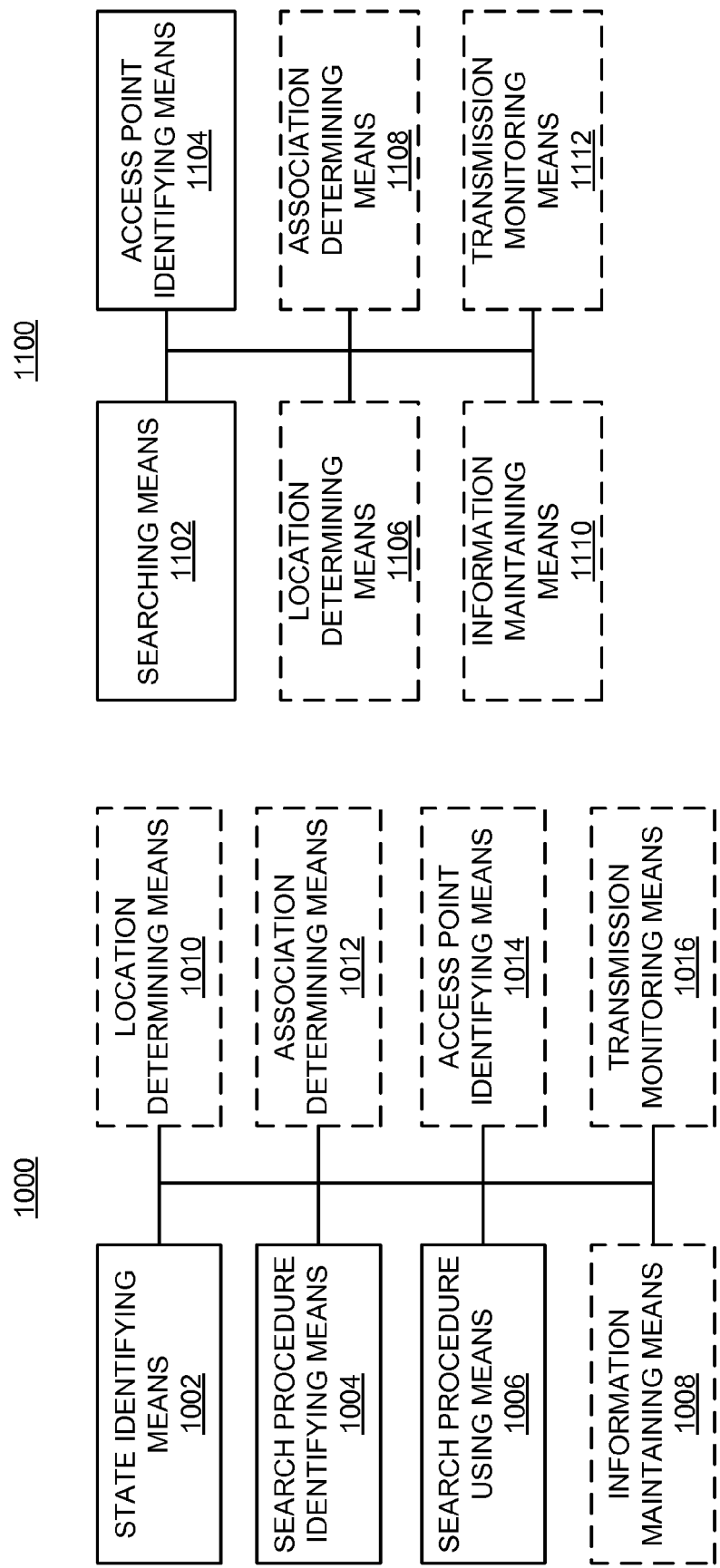

WIRELESS NODE SEARCH PROCEDURE

CLAIM OF PRIORITY UNDER 35 U.S.C. §119

This application claims the benefit of and priority to commonly owned U.S. Provisional Patent Application No. 60/891,014, filed Feb. 21, 2007, and assigned, the disclosure of which is hereby incorporated by reference herein.

BACKGROUND

1. Field

This application relates generally to wireless communication and more specifically, but not exclusively, to a search procedure for identifying and optionally associating with a wireless node such as an access point.

2. Introduction

A wireless communication system may comprise a network of two or more wireless devices where each wireless device may support one or more communication technologies to wirelessly transmit information to and receive information from another device in the network. A wireless network may be implemented in various ways. For example, some types of wireless networks may utilize centralized traffic flow whereby a central coordinator handles traffic flow to and from other wireless devices in the network.

A Wi-Fi network (i.e., an IEEE 802.11-based network) is one example of a wireless technology that may employ centralized traffic management. In a Wi-Fi network, an access point that is connected to a network may provide connectivity and traffic management functionality to enable wireless devices such as access terminals that are within a coverage area of the access point to send data to and receive data from other devices connected to the network.

Under certain circumstances, an access terminal may lose its connection to its associated access point. For example, the access terminal may move out of the coverage area of the access point or the access point may fail in some way. If such a connection is lost, it may be desirable for the access terminal to search for other access points in the vicinity so that the access terminal may reestablish wireless communication.

SUMMARY

A summary of sample aspects of the disclosure follows. It should be understood that any reference to the term aspects herein may refer to one or more aspects of the disclosure.

The disclosure relates in some aspects to a procedure for searching for wireless nodes. For example, a device such as a wireless access terminal (e.g., station) may be configured to scan for nearby access points and maintain a list of candidate access points. From the candidate list, the access terminal may identify an access point with which the access terminal may associate in the event the access terminal's communication with its current access point deteriorates for some reason.

In some aspects these operations may be performed in a proactive manner whereby the access terminal repeatedly performs scans and updates its list of candidate access points. That is, rather than waiting for communication with its current access point to deteriorate before identifying a new access point, the access terminal may have a preselected candidate access point to which the access terminal may readily associate, if necessary. In conjunction with these operations, the access terminal may monitor signals associated with its current access point and the candidate access points to determine when a switch to one of the candidate access points is warranted.

In some aspects the search procedure may be based on a state of the wireless device. For example, an access terminal may use one search procedures when the access terminal is searching for wireless coverage, another search procedure when the access terminal is idle, yet another search procedure when the access terminal is handling non-real-time traffic, still another search procedure when the access terminal is handling real-time traffic, and so on.

In some aspects the different states of the access terminal may be associated with different optimization criteria. For example, when the access terminal is in a search state or an idle state, the search procedure may be optimized to reduce the power consumption of the access terminal. In contrast, when the access terminal is in a non-real-time traffic state, the search procedure may be optimized to enable the access terminal to provide high throughput for the traffic. Furthermore, when the access terminal is in a real-time traffic state, the search procedure may be optimized to enable the access terminal to ensure that it meets the quality of service (e.g., latency) requirements of the traffic. In some aspects, optimizations to improve Wi-Fi search procedures may take into account location-related information as well as Wi-Fi deployment factors such as hidden SSIDs, regulatory restrictions on active transmission, and specifics of Wi-Fi coverage.

BRIEF DESCRIPTION OF THE DRAWINGS

These and other sample aspects of the disclosure will be described in the detailed description and the appended claims that follow, and in the accompanying drawings, wherein:

FIGS. 10 and 11 are simplified block diagrams of several sample aspects of apparatuses configured to support wireless node searching as taught herein.

Figure 1A:
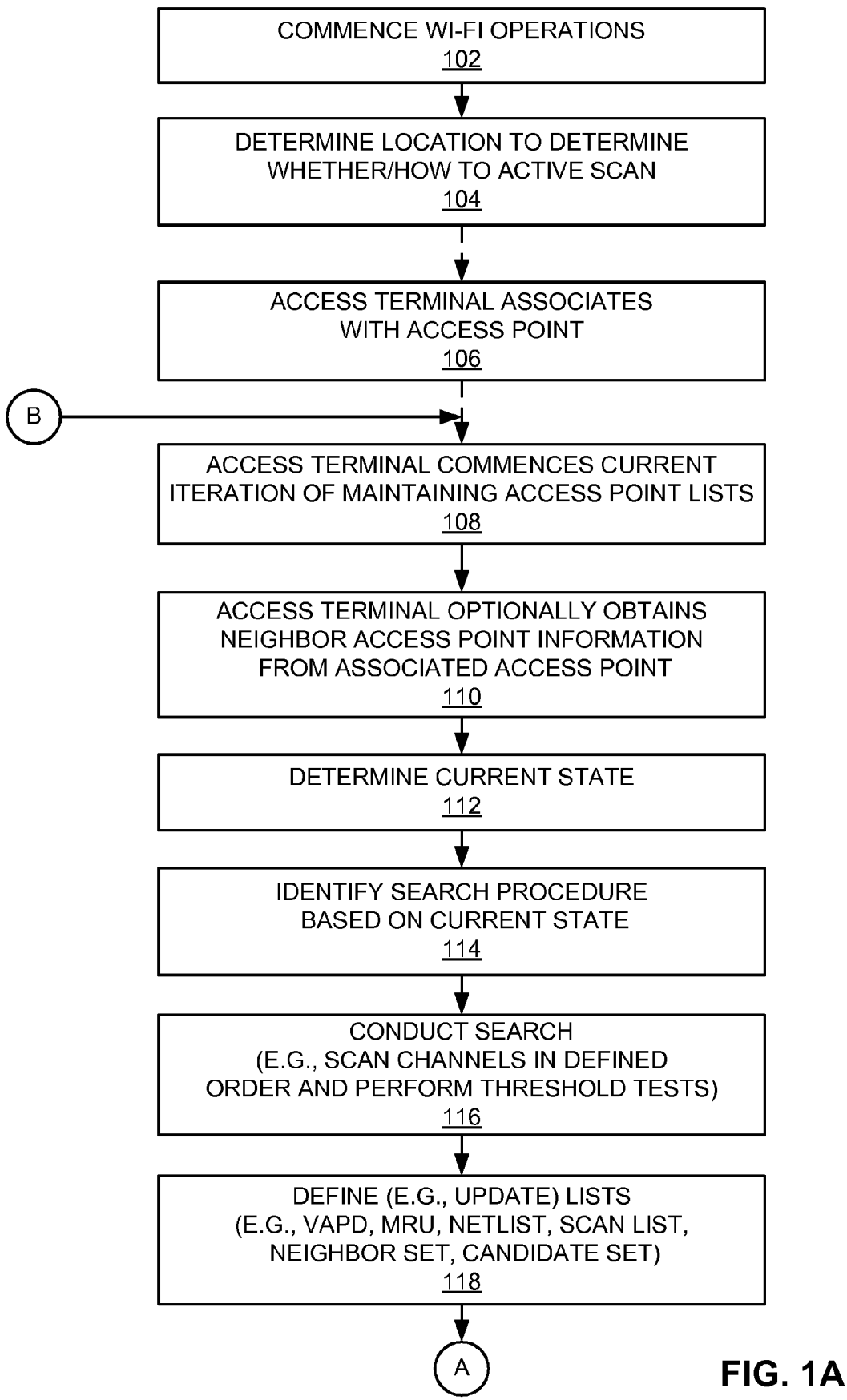
FIGS. 1A and 1B are a flowchart of several sample aspects of operations that may be performed to identify neighboring wireless nodes and switch association between neighboring wireless nodes.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, any aspect taught herein may comprise at least one element of a claim.

Figure 1B:
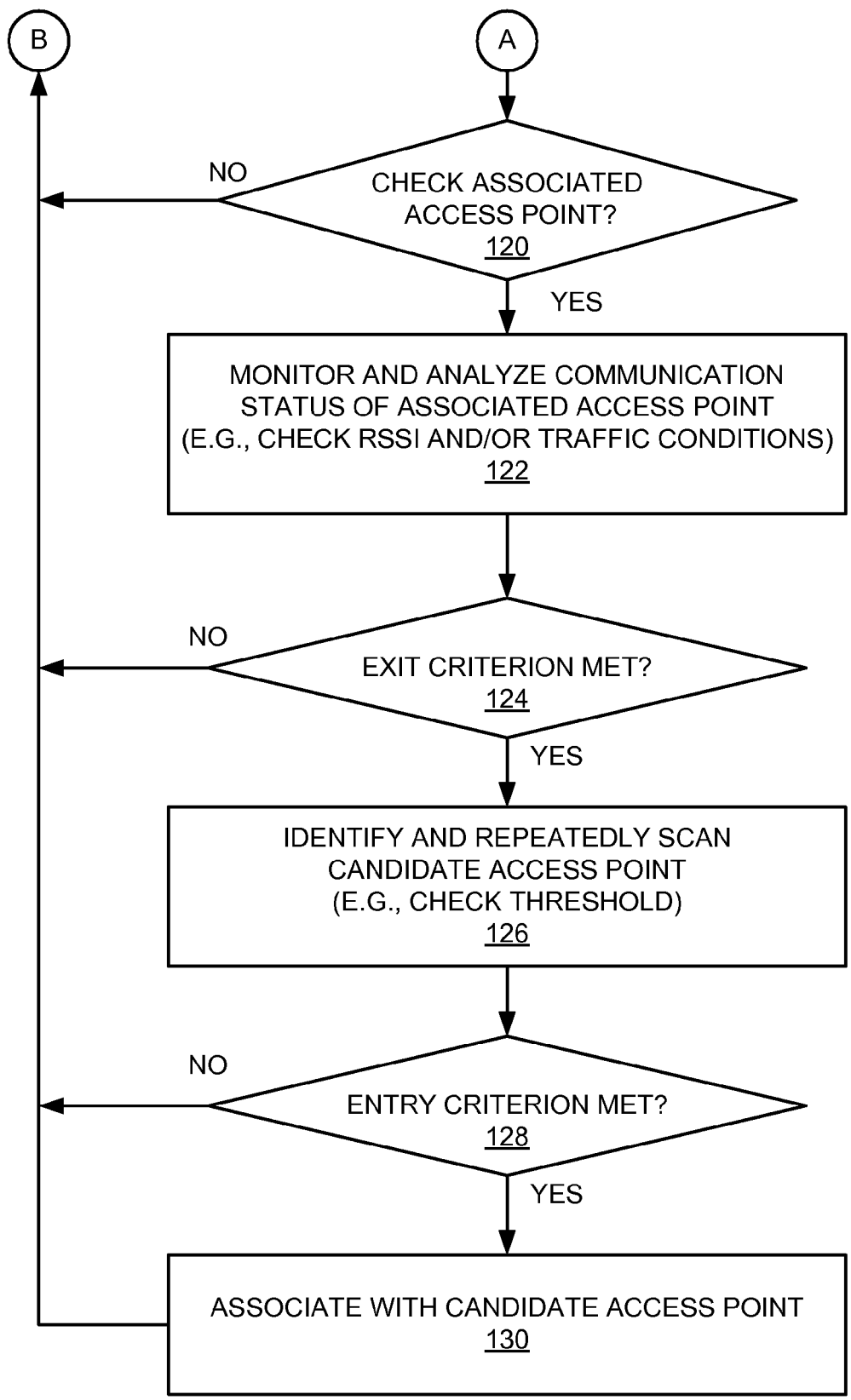

FIGS. 1A and 1B illustrate several sample operations that may be performed by a wireless node in conjunction with searching for and associating with another wireless node. For illustration purposes, the disclosure that follows describes an example where an access terminal employs a Wi-Fi search procedure to identify nearby access points and then associates with a selected one of the access points. It should be appreciated, however, that the teachings herein may apply to other types of wireless nodes and other types of wireless communication technologies (e.g., WiMax or some other suitable technology).

Figure 2:
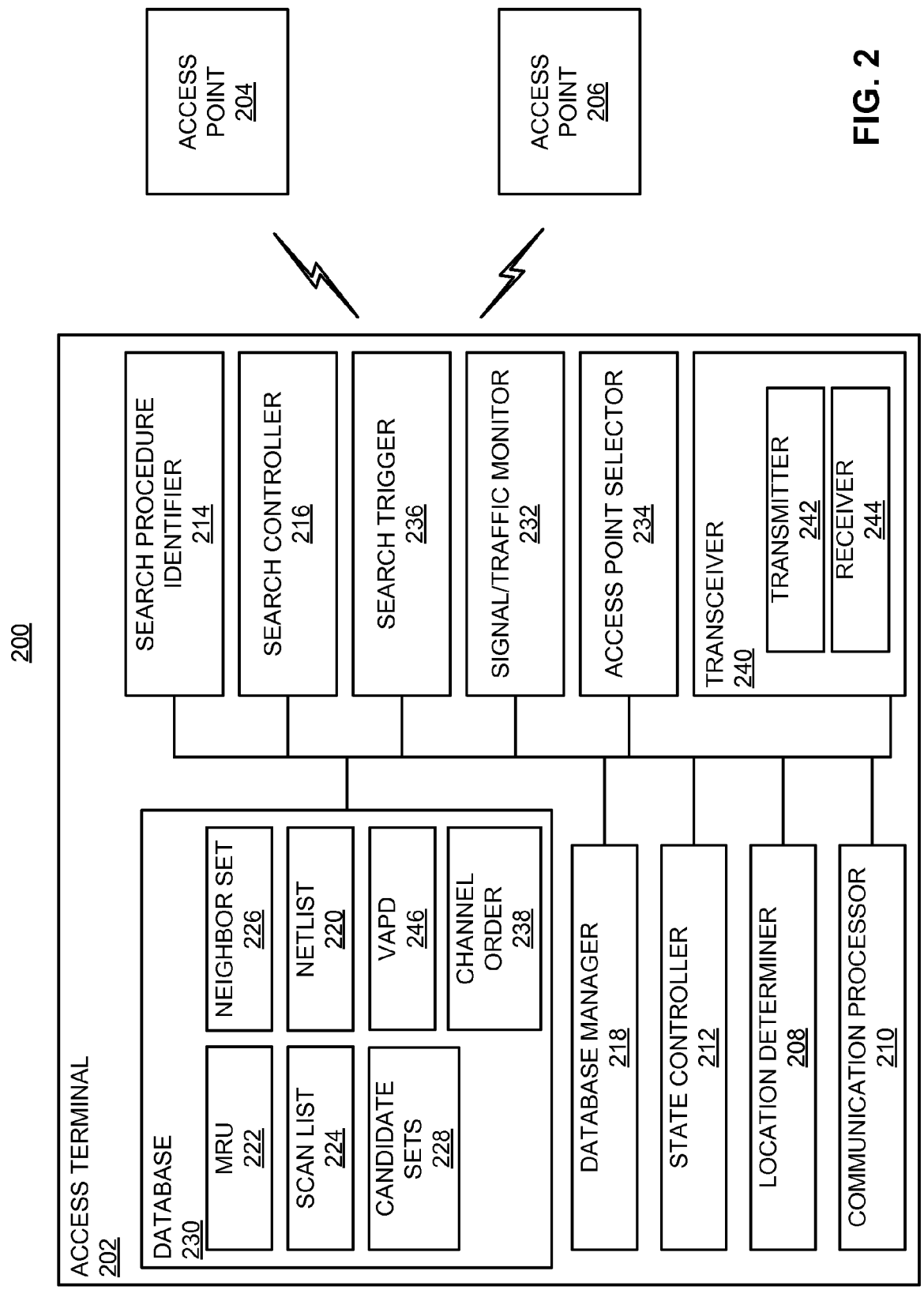
FIG. 2 is a simplified block diagram of several sample aspects of a communication system including wireless nodes.

For convenience, the operations of FIG. 1 or any other operations discussed or taught herein may be described as being performed by specific components (e.g., components of a wireless communication system 200 as shown in FIG. 2). It should be appreciated, however, that these operations may be performed by other types of components and may be performed using a different number of components. It also should be appreciated that one or more of the operations described herein may not be employed in a given implementation.

A brief overview will now be provided in the context of the example of FIG. 2. In the system 200, an access terminal 202 repeatedly conducts Wi-Fi searches to determine whether it may associate with a nearby access point. For example, in an enterprise environment where multiple access points associated with a common SSID are distributed throughout a building, a campus, and so on, it may be desirable for the access terminal 202 to be able to readily switch its association from one access point to another access point as the access terminal 202 moves through the environment (e.g., to maintain a high quality connection). In addition, when a multi-mode (e.g., WWAN and WLAN) access terminal 202 that is communicating via a WWAN (e.g., a cellular network) enters a home environment, it may be desirable for the access terminal 202 to associate with the WLAN at the home environment (e.g., to obtain access to different services and/or services having better quality of service).

Here, a determination regarding whether to switch a current association may thus be based on whether the access terminal 202 is preauthorized to communicate with a given access point. Continuing with the above examples, the access terminal 202 may be preauthorized to associate with certain access points in an enterprise environment (e.g., at a user's workplace), at a user's home, and so on.

In some cases a determination regarding whether to switch a current association may be based on at least one characteristic associated with a communication link that may be established between the access terminal 202 and an access point. For example, the access terminal 202 may elect to associate with an access point only if a received signal strength indication ("RSSI") associated with the access point exceeds a specified threshold.

Once the access terminal 202 associates with a given access point (e.g., an access point 204), the access terminal 202 may continue to search for nearby access points to maintain a list of candidate access point with which the access terminal 202 may associate at some later point in time. By actively searching for such access points and prioritizing any access points that have been found, the access terminal 202 may quickly associate with a different access point whenever it is deemed appropriate to do so. For example, the access terminal 202 may consider associating with a different access point (e.g., access point 206) if an exit criterion is met for disassociating with the access point 204 (e.g., there is a deterioration in communications with the access point 204). The access terminal 202 may then associate with the access point 206 if an entry criterion is satisfied (e.g., the access point 206 currently offers better service than the access point 204). In some aspects, handoffs may be limited to the same SSID (or mobility domain ID "MDID" or homogenous extended SSID "HESSID") in enterprise or other similar applications where common SSIDs (or MDIDs or HESSIDs) may be associated with the same mobility and security domain.

Figure 3:
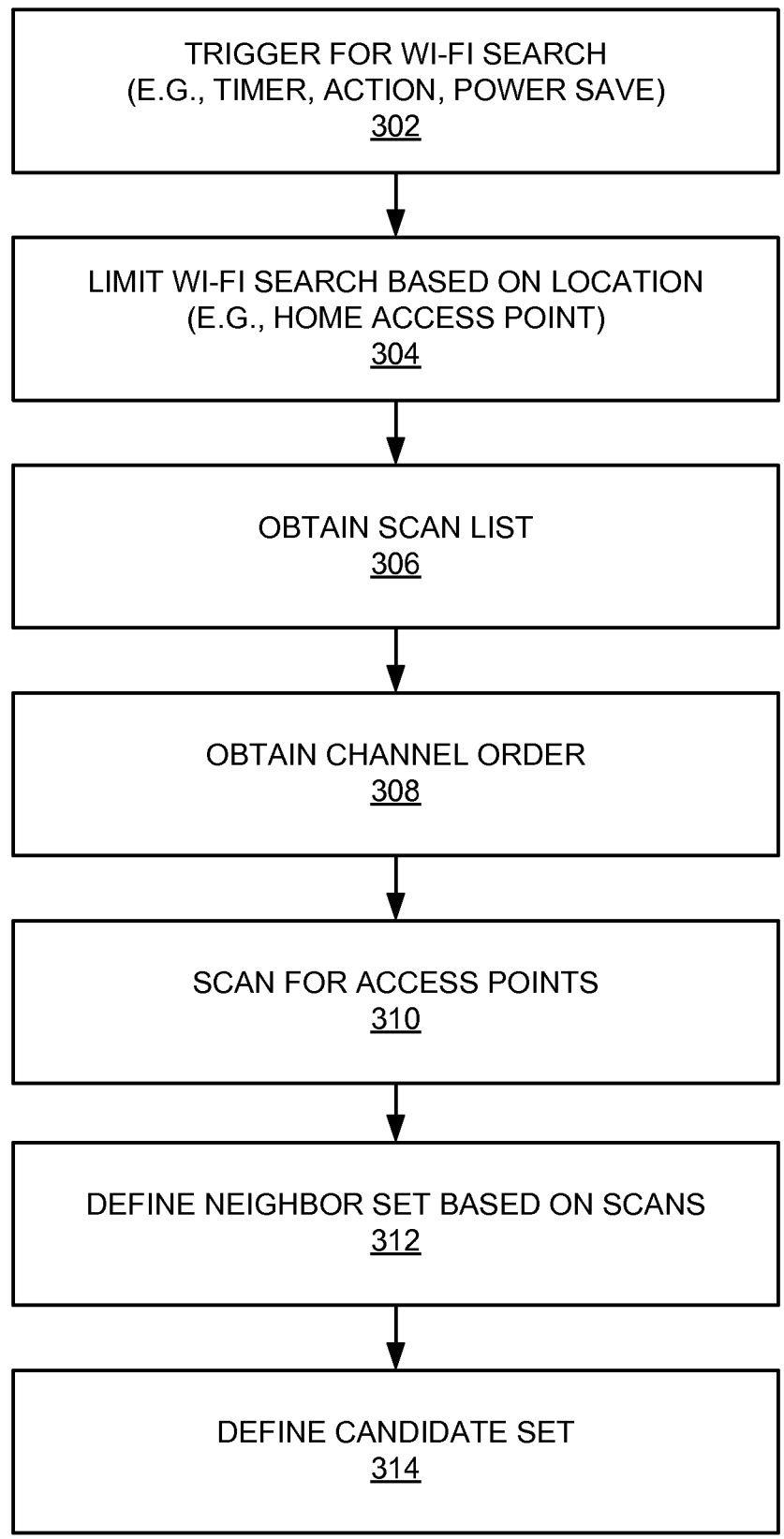
FIG. 3 is a flowchart of several sample aspects of operations that may be performed in conjunction with searching for a wireless node such as an access point.
Figure 4:
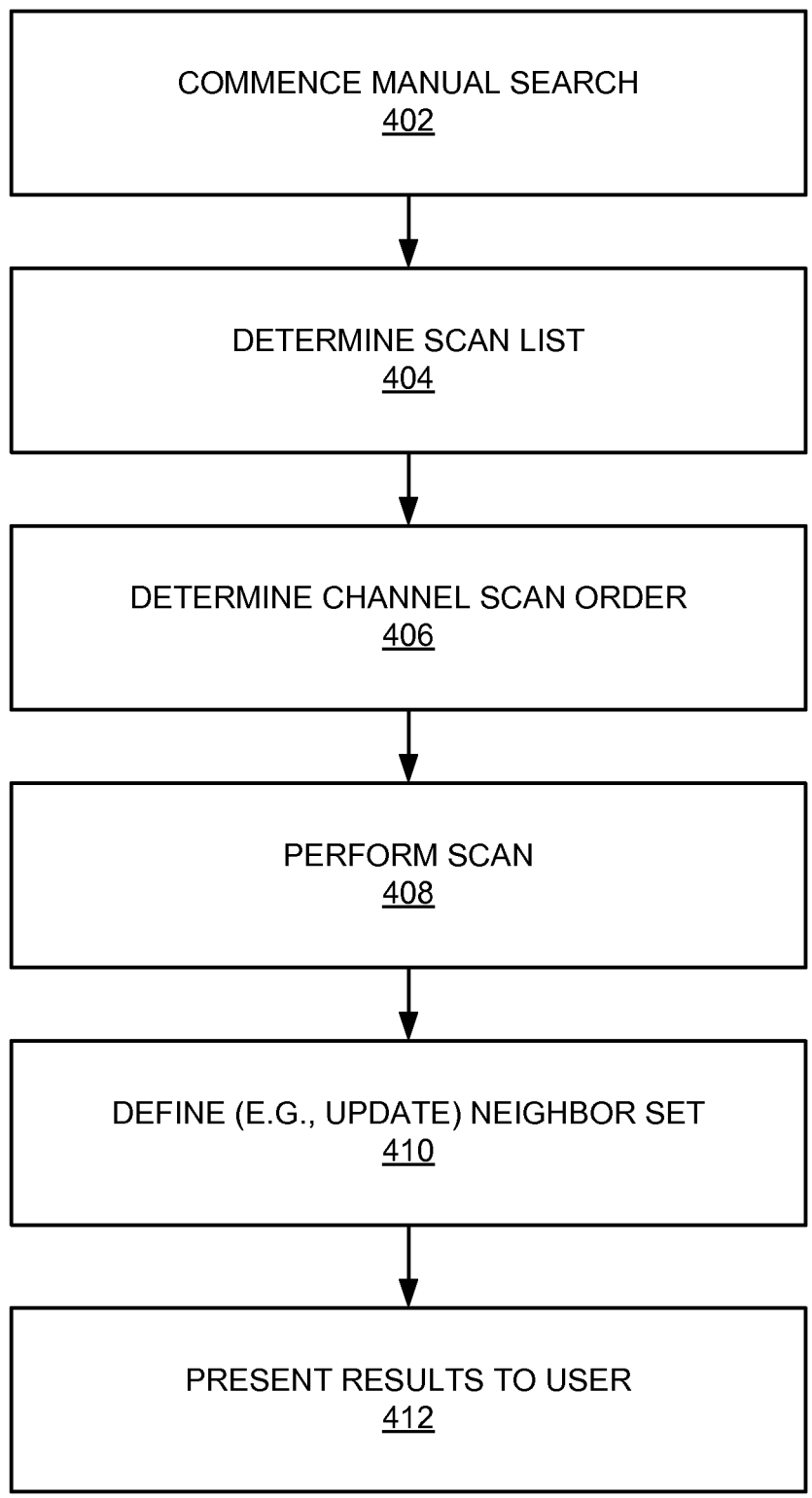
FIG. 4 is a flowchart of several sample aspects of operations that may be performed in conjunction with a manual search performed during an unassociated state.
Figure 5:
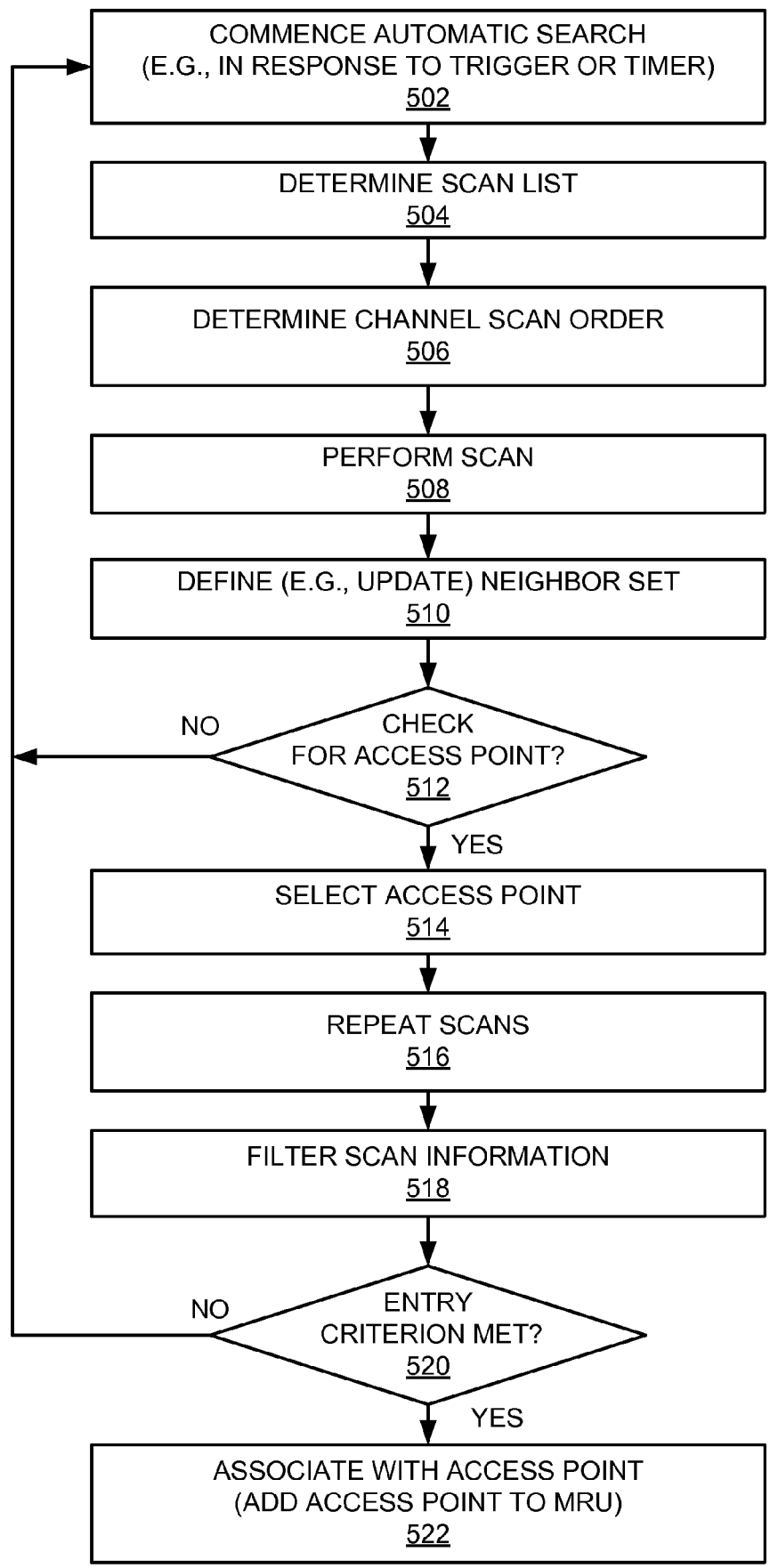
FIG. 5 is a flowchart of several sample aspects of operations that may be performed in conjunction with an automatic search performed during an unassociated state.
Figure 6:
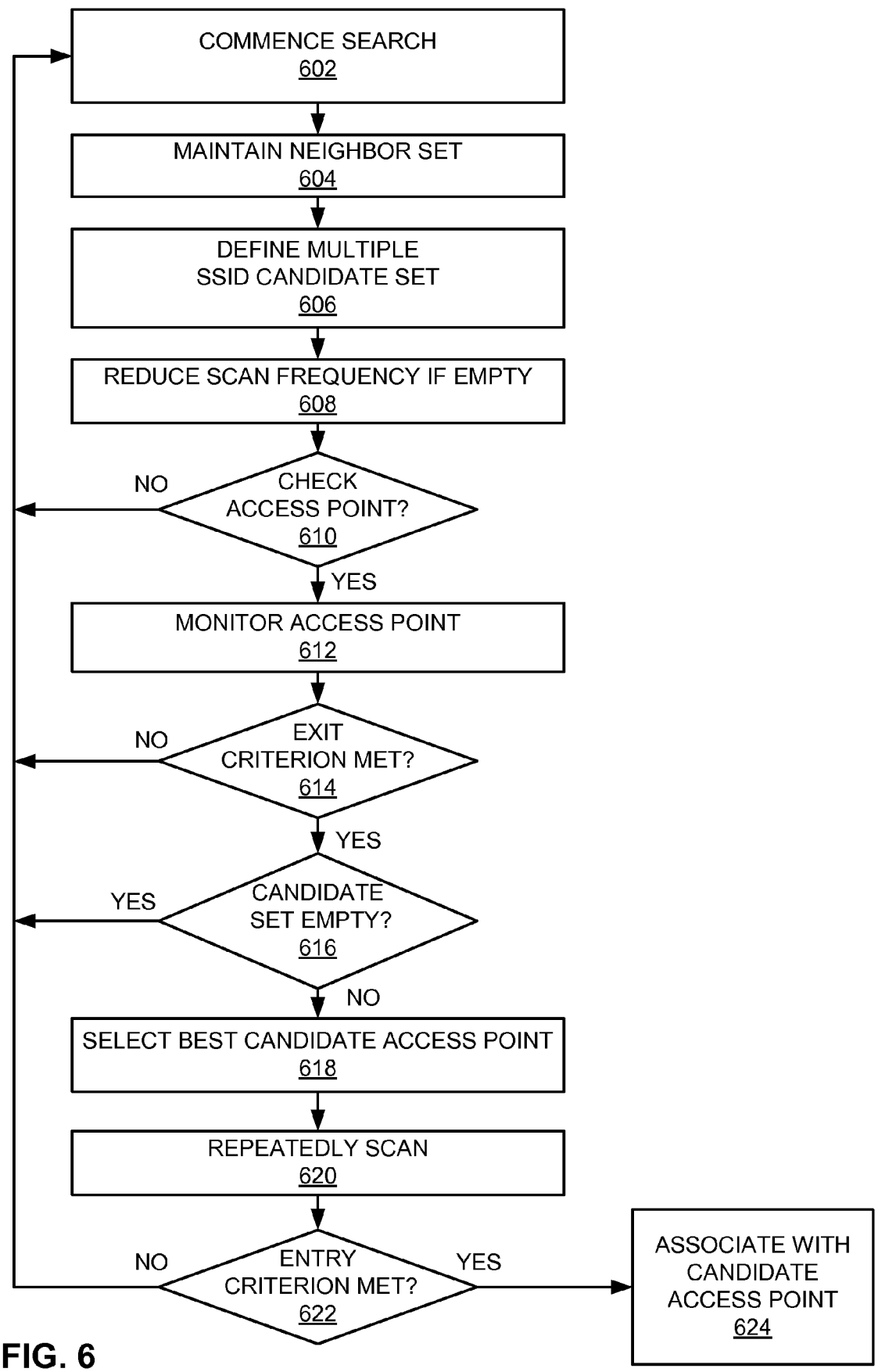
FIG. 6 is a flowchart of several sample aspects of operations that may be performed in conjunction with a search performed during an idle state.
Figure 7:
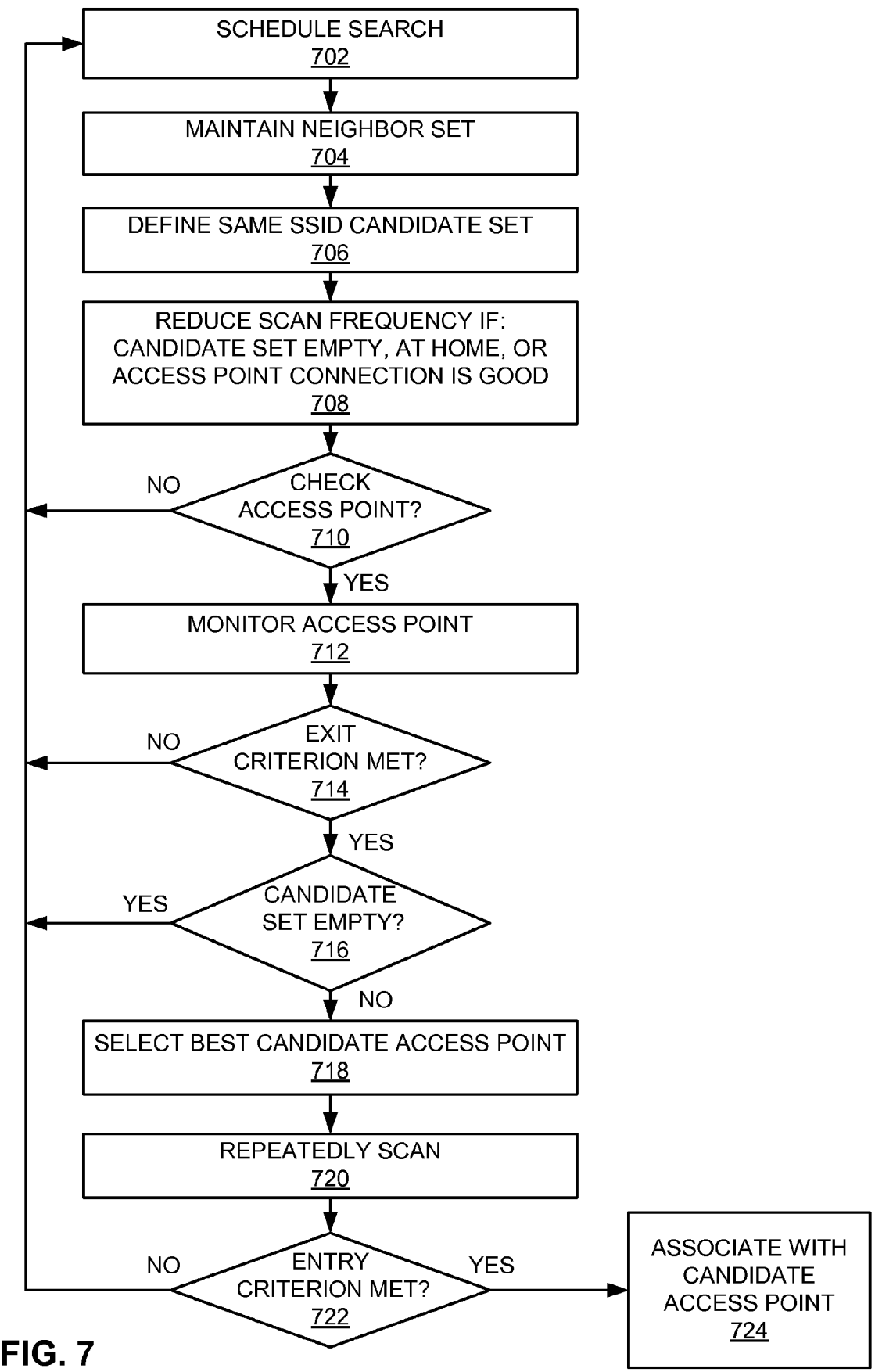
FIG. 7 is a flowchart of several sample aspects of operations that may be performed in conjunction with a search performed during a non-real-time state.
Figure 8:
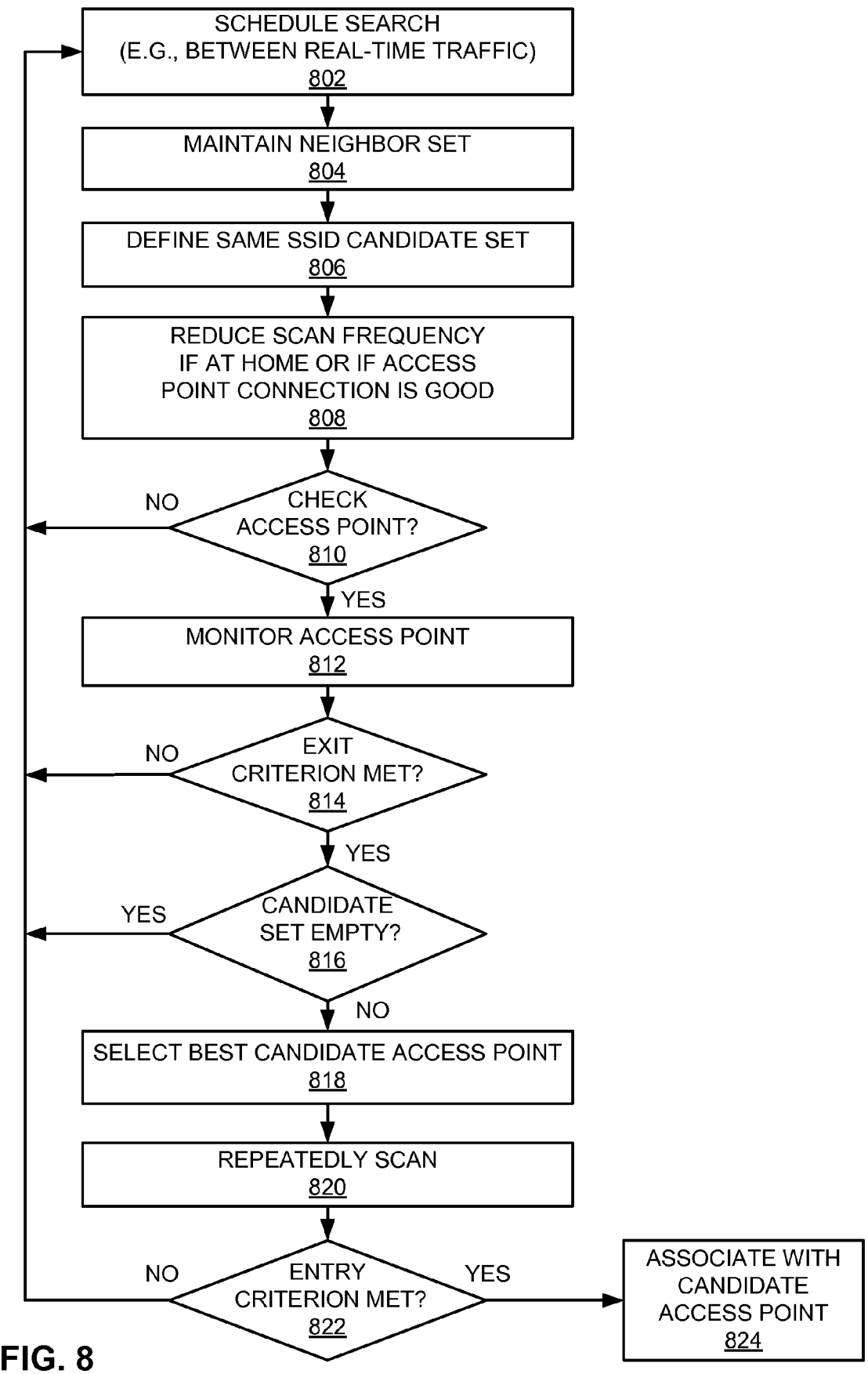
FIG. 8 is a flowchart of several sample aspects of operations that may be performed in conjunction with a search performed during a real-time state.

These and other operations will now be described in more detail in conjunction with FIGS. 1A-8. Briefly, FIG. 3 provides an overview of search procedures that may be employed in conjunction with one or more operational states of a wireless terminal. FIGS. 4 and 5 describe operations that may be performed in conjunction with an unassociated state (e.g., no Wi-Fi state). In particular, FIG. 4 describes several operations that may be performed in conjunction with a manual search while FIG. 5 describes several operations that may be performed in conjunction with an automatic search. FIG. 6 describes operations that may be performed in conjunction with an idle state. FIG. 7 describes operations that may be performed in conjunction with a non-real-time traffic state. FIG. 8 describes operations that may be performed in conjunction with a real-time traffic state.

Referring to FIG. 1A, as represented by block 102, at some point in time the access terminal 202 commences Wi-Fi-related operations or at some other point(s) in time. In some aspects, the manner in which Wi-Fi operations are commenced may depend on the capabilities of the access terminal 202. For example, in cases where the access terminal only supports Wi-Fi operations, the operations of block 102 may commence when the access terminal 202 is enabled in some manner. In cases where the access terminal supports Wi-Fi operations and other wireless operations, the operations of block 102 may correspond to the access terminal 202 being configured in a certain way. For example, if the access terminal 202 supports both Wi-Fi and cellular (e.g., 2G/3G) connectivity, the operations of block 102 may correspond to a user configuring the access terminal 202 to a mode that supports Wi-Fi connectivity (e.g., in addition to or instead of cellular connectivity). In some implementations the access terminal 202 may commence Wi-Fi-related operations automatically. For example, Wi-Fi operations may commence automatically upon power up, upon reset, upon loss of Wi-Fi connectivity, and upon invocation of periodic background Wi-Fi searches.

In some cases, the access terminal 202 will scan for both Wi-Fi and cellular systems at power up. For example, the access terminal 202 may scan for these systems in a sequential manner (e.g., first Wi-Fi, then cellular, then Wi-Fi, and so on) based on some priority (e.g., as configured into the access terminal 202). Alternatively, the access terminal 202 may scan for these systems in parallel to keep the time to first call as short as possible. In cases where the access terminal 202 has multiple RF sections (e.g., one for Wi-Fi and one for cellular), parallel scanning may be preferred since the access terminal 202 may be awakened from a power save mode less often which may, in turn, reduce the power consumption of the access terminal 202.

As represented by block 104, the access terminal 202 may determine its current location after initiating Wi-Fi operations. In some aspects, the access terminal 202 uses this location information to determine whether it may scan for access points and, if so, how it may do so. For example, the access terminal 202 may determine its current geographic location (e.g., country) to thereby determine which channels it may use, and whether it may actively scan those channels or whether it should passively scan those channels.

The access terminal 202 (e.g., a location determiner component 208) may determine geographic location in a variety of ways. For example, in some cases a user may manually specify the current geographic region (e.g., by keying-in the information).

In some cases geographic location may be determined by using position location technology such as a global positioning system ("GPS"), differential GPS ("DGPS"), assisted GPS ("AGPS"), or some other suitable technology. Here, the current geographic location may be determined from latitude-longitude information provided by such technology.

In some cases geographic location information such as a mobile country code ("MCC") may be embedded in signaling information that is broadcast over a wide area wireless network ("WAN") such as CDMA2000 1X, CDMA2000 1X-EVDO, GSM, UMTS, and so on. Here, the MCC information may denote the current country and geographic region.

In some cases the access terminal 202 may be provisioned with or may build a database that maps the identity of a WAN base station to a current location. Such identity information may take the form of, for example, a system identifier ("SID"), a network identifier ("NID"), a basic service set identifier ("BSSID"), a pseudo-noise ("PN") offset, and so on.

In cases where the access terminal 202 is able to determine its current geographic location, the access terminal 202 may elect to conduct active scans and/or passive scans. These operations are described in more detail below.

In cases where the access terminal 202 is not able to determine its current geographic location, the access terminal 202 may resort to passive scanning only or limited scanning (e.g., as defined by IEEE 802.11d). In some cases, the access terminal 202 may receive information during a passive scan relating to its current location. For example, the access terminal 202 may receive a beacon that includes a country information element. In this case, depending on the corresponding location information, the access terminal 202 may switch to active scanning. Alternatively, if the access terminal 202 receives beacons without a country information element, the access terminal 202 may potentially use active scanning on a corresponding channel or corresponding channels.

As represented by block 106, as a result of Wi-Fi scanning, at some point in time the access terminal 202 may identify a nearby access point and then associate with that access point. To this end, the access terminal 202 may include a communication processor 210 or some other suitable component that is adapted to perform operations to authenticate the access terminal 202 to the access point 204 and associate these components with one another.

As represented by blocks 108-118, and commencing at block 108 the access terminal 202 may obtain information about neighboring access points on a repeated basis. As represented by block 110, in some cases this may involve receiving information from an associated access point. As an example, the access point 204 may obtain information about its neighboring access points and provide that information to all of its associated access terminals (e.g., including access terminal 202).

As represented by blocks 112-116, the access terminal 202 may obtain information about neighboring access points by performing Wi-Fi searches and maintaining information about any access points identified by those searches. In some aspects the search procedure used by the access terminal 202 may depend on the current state of the access terminal 202. For example, the access terminal 202 may use one type of search procedure when it is in an unassociated state, another type of search procedure when it is in an idle state, yet another type of search procedure when it is in a non-real-time state, and still another type of search procedure when it is in a real-time state.

In some aspects, the search procedure for a given state may be associated with specific optimization criteria. For example, the search procedures for the unassociated and idle states may be optimized to save power. In contrast, the search procedure for the non-real-time state may be optimized to ensure that the access terminal 202 provides adequate bandwidth (e.g., throughput) for all of its traffic flows. In addition, the search procedure for the real-time state may be optimized to ensure that the access terminal 202 meets the quality of service requirements of its traffic flows.

In some aspects, one or more parameters (e.g., used by the different search procedures) may be a function of the current state. For example, the different search procedures may employ different thresholds (e.g., scanning interval threshold, RSSI thresholds, etc.) and different sized SSID-related lists (e.g., candidate lists). In this way, a desired tradeoff may be made between latency of inter-access point handoff and power consumption due to scanning.

It should be appreciated that a state-based search scheme as taught herein may be implemented in various ways. For example, different schemes may employ different states (e.g., other than those described here) and these different states may be associated with different optimization criteria (e.g., other than those described here).

As represented by block 112 of FIG. 1A, upon invocation of a wireless search, the access terminal 202 may determine (e.g., define) its current state. To this end, as shown in the example of FIG. 3, the access terminal 202 may include a state controller 212 that specifies or monitors wireless states (e.g., Wi-Fi states) of the access terminal 202. In some implementations, a determination as to whether the current state relates to real-time or non-real-time traffic may involve determining whether an application has requested quality of service (e.g., 802.11e-based service). In addition, in some implementations application program interfaces ("APIs") may be employed in the advanced mobile subscriber software ("AMSS") such that the APIs do not forward the quality of service requests to an access point when that access point does not support 802.1e, however, the APIs may use this information to determine the real-time or non-real-time mode of operation and manage scanning of neighboring access points accordingly.

As represented by block 114, the access terminal 202 (e.g., a search procedure identifier 214) may identify the search procedure to be used based on the current state. For example, when the access terminal 202 is in an unassociated state, the invocation of a wireless search may result in execution of one type of search routine and/or the use of one set of search parameters. Conversely, when the access terminal is in an idle state, the invocation of a wireless search may result in execution of a different type of search routine and/or the use of another set of search parameters, and so on.

As represented by block 116, the access terminal 202 (e.g., a search controller 216) conducts the specified search procedure. As will be described in more detail in conjunction with FIG. 3, in some aspects this may involve scanning for access points using a defined channel scanning order and/or a defined SSID scanning order, and comparing the results of the search (e.g., RSSI of received signals) with one or more thresholds.

As represented by block 118, the access terminal 202 (e.g., a database manager 218) may then define one or more lists including information relating to access points that the access terminal may potentially associate with. Moreover, the information in one or more of these lists may be ordered (e.g., prioritized) to enable the access terminal to readily identify the access point that currently provides the best service. As will be described in more detail below, in some aspects these lists may comprise one or more of a netlist 220, a most recently used ("MRU") list 222, a scan list 224, a neighbor set 226, and one or more candidate sets 228, or a visited access point database ("VAPD") 246 maintained in a database 230 or in some other suitable manner. The operations of blocks 108-118 may be repeated (e.g., on a periodic basis) to maintain the lists of access point information. In this way, the access terminal 202 may have at its ready a current set of access information, thereby enabling the access terminal 202 to quickly and reliably acquire WLAN coverage.

The access terminal 202 (e.g., a signal and/or traffic monitor 232) also may repeatedly monitor one or more aspects of its communication link with its currently associated access point (e.g., access point 204) to determine whether it should consider switching to another access point. Accordingly, as represented by blocks 120 and 122, at various points in time (e.g., periodically) the access terminal 202 may invoke operations to monitor the link and analyze any acquired information.

Various techniques may be employed to monitor the currently associated access point. For example, in some cases the access terminal 202 may monitor the RSSI of periodic pilot signals (e.g., beacons) or other signals that are received from the access point 204. In some cases the access terminal 202 may analyze traffic conditions between the two nodes. For example, the access terminal 202 may track uplink and/or downlink errors (e.g., frame loss or retry rate). These techniques are treated in more detail in conjunction with FIGS. 6-8.

As represented by block 124, if the criterion (or criteria) for exiting the current association is not met, the access terminal 202 maintains the current association and continues maintaining its lists and monitoring its associated access point. This exit criterion may be based on the information monitored at block 122. For example, an exit criterion may be satisfied if the RSSI falls below a threshold level, if the frame loss exceeds a threshold level, if the retry rate exceeds a threshold rate, or if some combination of these or other criteria are met.

If the criterion (or criteria) for exiting the current association is met at block 124, the access terminal 202 (e.g., an access point selector 234) determines whether the entry criterion for another access point is met. Here, the selection of a particular access point (e.g., access point 206) for consideration at this time may be based on the ordering of a candidate list maintained by the access terminal 202 (e.g., at block 118). For example, as discussed at FIG. 3 below, the access terminal 202 may maintain a prioritized list of candidate access points wherein the access point that is expected to provide the best connectivity is placed at the top of the list. The selection of a candidate access point may be based on various criteria. For example, in some cases the decision to select a candidate access point may be based on admission control, TSPECs, quality of service, or prior interactions with the access point. In some cases, the access terminal 202 may maintain this type of information in the VAPD.

Once the highest priority candidate access point is selected at block 126, the access terminal 202 may repeatedly monitor signals associated with that access point to determine whether to associate with that access point. For example, the access terminal 202 may repeatedly send directed active scans (e.g., pilot requests) to the candidate access point 206. The access terminal 202 may then process any signals (e.g., pilots signals) it receives from the access point 206 to determine whether these signals meet some criterion or criteria (e.g., the RSSI of the signals exceeds a threshold) on a repeated basis. In this way, the access terminal 202 may verify that the higher signal quality associated with the access point 206 is not excessively transient in nature.

As represented by block 128, if the criterion (or criteria) for entering into an association with the candidate access point is not met, the access terminal 202 maintains the current association (e.g., with access point 204) and continues maintaining its lists and monitoring the access point 204. This entry criterion may be based, for example, on the information described at block 126.

If the criterion (or criteria) for entering into a new association is met at block 128, the access terminal 202 associates with the candidate access point 206 (block 130). The above operations may then be repeated to continually maintain the access point lists and monitor the signaling between the access terminal 202 and any access point with which it is currently associated.

In some cases, handoff operations similar to those described above may be employed to determine whether to handoff from the current access point to another access point or to another network (e.g., a cellular system). For example, if the exit criteria for the current access point are met (e.g., at block 124), the selection of the target system may be performed based on whether access point entry criteria are met (e.g., at block 128). For example, an access terminal may select a target system based on whether there are any access points having an RSSI above a defined threshold as discussed above. In the event there are no access points meeting these criteria, however, the access terminal may elect to move to (e.g., identify, then connect with) a cellular system or some other alternative network.

With the above overview in mind, additional details relating to Wi-Fi searching and maintaining lists of access point information will now be described in conjunction with FIG. 3. As mentioned above and as discussed below in conjunction with FIGS. 4-8, in some aspects the Wi-Fi search procedures may depend on the current state of the access terminal. To facilitate the discussion of the state-specific Wi-Fi search procedures that follow, FIG. 3 provides an introductory overview of several common operations that may be employed in conjunction with these search procedures.

As represented by block 302, a variety of circumstances and associated components (as represented by a search trigger component 236) may trigger the commencement of a Wi-Fi search. For example, in some cases a timer may be used to determine when to invoke a search. As will be discussed below, the duration of the timer may be adjusted based on current conditions in the system. In some cases a search may be invoked in response to an action. For example, a search may be invoked when a user activates a user input device (e.g., a key on a keypad) of the access terminal 202, when a user opens a cover (e.g., a clamshell cover) of the access terminal 202, when inbound and/or outbound calls and/or sessions are commenced, and so on.

As will be discussed below, in some cases a search may be invoked based on timing of a power save-related mode of operation for the access terminal 202. For example, a search may be invoked when the access terminal 202 informs its associated access point that it is going into a power save mode. In addition, a search may be invoked at times specified in conjunction with an unscheduled automatic power save delivery ("U-APSD") mode.

As represented by block 304, in some cases Wi-Fi searching may be limited (e.g., delayed or not invoked) based on the location of the access terminal. For example, in the event the access terminal 202 is associated with its home access point, the access terminal 202 may cease searching for other access points or may lengthen the interval at which it searches for other access points. Here, it should be appreciated that in such an environment there may not be any other nearby access points with which the access terminal is authorized to associate. Thus, the access terminal 202 may conserve resources by reducing its Wi-Fi searches under these circumstances. Such an environment may stand in contrast with, for example, an enterprise scenario where multiple access points associated with a common SSID may be distributed throughout the enterprise environment.

In some aspects the location of the access terminal 202 may be indicated by the access point with which the access terminal 202 is currently associated. For example, the access terminal 202 (e.g., the location determiner 208) may determine whether it is currently associated with its home access point (e.g., as indicated by a specific SSID or MAC ID).

It should be appreciated that Wi-Fi searching may be limited based on various criteria. For example, the timing of a Wi-Fi search may be defined to meet one or more performance criteria associated with the current state of the access terminal 202. As a specific example, searches may be conducted less frequently in cases where it is desirable to avoid interfering with other operations of the wireless device (e.g., Wi-Fi traffic or WWAN traffic). As another example, in some aspects the frequency of Wi-Fi searches may depend on the quality of the communication link between the access terminal and its associated access point. For example, if the quality of the link is improving (e.g., as indicated by an increase in RSSI) the scans may be invoked less frequently, and vice versa.

As represented by block 306, once a Wi-Fi search is invoked, the access terminal 202 obtains (e.g., constructs and/or accesses) a scan list that specifies, for example, the SSIDs to be scanned by the access terminal 202 during the current Wi-Fi search. Such a scan list may be implemented in various ways.

In some cases a scan list may be a subset of one or more other lists maintained by the access terminal 202. For example, the scan list may be a subset of a netlist or a most recently used ("MRU") list maintained by the access terminal 202.

In some implementations this netlist describes all access points known to the access terminal 202. Such a netlist may indicate whether the access terminal 202 is authorized to associate with a given access point and may include information (e.g., credentials) that facilitates such an association. In some cases a netlist may include information that identifies a given access point such as an associated SSID, a MAC ID (e.g., MAC address), and so on.

The information in the netlist may be provided to the access terminal 202 and/or determined by the access terminal. As an example of the former scenario, a service provider may download netlist information (e.g., a list of authorized access points) into the access terminal 202 when the access terminal 202 is provisioned. As an example of the latter scenario, in some cases the access terminal 202 may add an access point it discovers to the netlist (e.g., discovered during a Wi-Fi search).

The MRU list mentioned above includes information about the access points that were most recently used by the access terminal 202. Such a list may be limited in some cases. For example, the number of entries in the MRU list may be limited and, once the list is full, the oldest entries in the list may be overwritten by new entries. In addition, access points may be purged from the list after a given period of time (e.g., ten days). In some cases, the MRU list comprises a subset of (e.g., is defined within) the netlist discussed above. However, if the user used a manual scan to find and associate with a non-authorized access point, the MRU list may include entries that are not in the netlist.

The entries in the scan list obtained at block 306 may be prioritized in some manner. For example, entries from the MRU list may have a higher priority, other entries from the netlist may have a lower priority, and a wildcard scan entry may be associated with yet another priority level. In such a case, the access terminal 202 may order its scans based on the designated priorities.

As represented by block 308, the access terminal 202 also may obtain (e.g., construct and/or access) a channel order 238 that specifies, for example, the order in which channels are to be scanned by the access terminal 202 during the current Wi-Fi search. In some cases the channel order 238 is provided in the netlist (e.g., along with the SSIDs to be scanned).

A channel order may be defined in various ways. For example, in some cases a channel order may be based on priorities assigned to each SSID and/or access point (e.g., by a service provider). In some cases a channel order may be based on the channels specified by the entries from the MRU list. In some cases a channel order for the 5 GHz band may be based on the geographic location of the access terminal 202.

Different types of scans may be employed in the 2.4 GHz band. For example, in some cases a channel order for the 2.4 GHz band may simply be a sequential listing of each of the different channels. In some cases a Wi-Fi channel order first specifies non-overlapping channels and then specifies overlapping channels.

In addition, in some cases an optimized scan may be employed whereby overlapping channels are scanned in groups such that a given scan effectively scans multiple channels at once. For example, a representative channel order for the 2.4 GHz band may be specified as: 1, 6, 11, 3, 8, 13, 4, and 9. Here, the scans for channels 3, 8, 13, 4, and 9 may cover multiple channels. For example, the scan for channel 3 may effectively scan channels 2, 3, and 4, while the scan for channel 8 may effectively scan channels 7, 8, and 9, and so on.

In some aspects, the channel order may be revised in an attempt to achieve a desired optimization for a given state. For example, if a scan detects energy on a given channel, that channel may be moved up in the channel order. In this way, the search may more quickly obtain information about any potential access points on that channel during subsequent searches. In addition, in some cases one or more designated channels (e.g., that are known to have operating access points) may be scanned during each iteration of the Wi-Fi search.

As represented by block 310, the access terminal 202 scans for access points based on the scan list and the channel order. For example, commencing with the first channel of the channel order, the access terminal 202 may scan for each of the SSIDs on the scan list, in the particular order specified by the scan list. The access terminal 202 may then scan the next channel of the channel order in a similar manner. In addition, an active scan may employ a wildcard SSID whereby all access points that support wildcard scans may send a probe response upon receipt of the wildcard SSID. Also, in some cases the access terminal 202 may optimize the search procedure by issuing multiple outstanding probe requests, each including a single SSID, on each channel or by issuing a single probe request, including multiple SSIDs, on each channel.

Here, it should be appreciated that the above scans may not be conducted on a contiguous basis. For example, the access terminal 202 may conduct a portion of the scans, then perform some other operations (e.g., handling data traffic flow), then perform another portion of the scans, and so on.

In some cases the access terminal may discover information relating to hidden SSIDs. For example, the VAPD may include information indicative of whether a given SSID is hidden or broadcast in a beacon. Consequently, the access terminal may perform active scans using the hidden SSID information provided by the VAPD.

In situations where there are a large number of hidden SSIDs, however, it may be more efficient to simply conduct a passive scan rather than conducting individual active scans for each hidden SSID. For example, if an active scan takes 20 ms, and if there are 6 hidden SSIDs, it may take longer to perform the hidden SSID scans than a passive scan (e.g., which may take on the order of 100 ms).

In some cases, the VAPD also may be used to identify an access point associated with a beacon containing a hidden SSID. For example, for any hidden SSID beacon received during a passive scan, the access terminal 202 may search the VAPD for the MAC ID contained in the beacon. If the search of the VAPD is successful, the access terminal will obtain the SSID of the access point that transmitted the beacon. The access terminal 202 may then include the SSID from the VAPD in a probe request directed to the access point. If there is failure in locating the MAC ID in the VAPD, the access terminal 202 may perform a series of active scans on the channel, successively including each of the hidden SSIDs from the VAPD in the probe request.

In some implementations, the VAPD may comprise a subset of (e.g., is defined within) the netlist discussed above. However, if the user uses a manual scan to find and associate with non-authorized access points, the VAPD may include information about access points that are not in the netlist.

If the access terminal 202 identifies any access points during its scans at block 310, the access terminal 202 may update its database 230. For example, the access terminal 202 may store the association between the MAC ID of the identified access point and its corresponding SSID in the VAPD. The VAPD also may store information (e.g., statistical information) relating to any prior interactions the access terminal 202 has had with a given access terminal. For example, the access terminal 202 may update a corresponding entry in the VAPD when it has successfully associated with a given access point or when it has failed to do so. Several additional examples of data sets that may be updated in the database 230 based on the results of a Wi-Fi search follow.

As represented by block 312, the access terminal 202 may define (e.g., construct or update) a neighbor set based on the results of its scans at block 310. The neighbor set may specify, for example, a set of access points that are relatively close to (e.g., within communication range of) the access terminal 202. In some implementations, in the event the access terminal 202 discovers an access point that is not in the netlist, the access terminal 202 may add an appropriate entry to the netlist. Thus, the neighbor set may comprise a subset of (e.g., is defined within) the netlist discussed above.

In some scenarios, at least a portion of the entries of the neighbor set may be provided to the access terminal 202. For example, an access point may transmit information it collects regarding access points in the vicinity to its associated access terminals (e.g., including access terminal 202).

As represented by block 314, during some states the access terminal 202 may generate one or more candidate sets based on the results of its scans at block 310. As mentioned above, a candidate set may specify the access point with which the access terminal 202 may associate in the event the access terminal elects to change its current association. A candidate set may consist of, for example, entries from the neighbor set that are also in the MRU list and/or the netlist. As will be discussed below, typically only a subset of these access points (e.g., those providing at least a minimum RSSI level) may be included in a candidate set.

Referring now to FIGS. 4 and 5, several operations relating to an unassociated Wi-Fi state will be described. In some aspects this state may refer to an extended period of time when an access terminal is not connected to an access point. In this state, the access terminal may perform various operations to find and associate with a WLAN (via an access point).

Unassociated state operations may be invoked, for example, when the access terminal is powered up or reset, or after the access terminal loses its association with an access point. As mentioned above, the invocation of a Wi-Fi search may be based on the current mode of operation (e.g., Wi-Fi only, cellular and Wi-Fi mode, etc.) of the access terminal.

As mentioned above, an access terminal may determine at the commencement of its Wi-Fi operations whether it may conduct active searches (i.e., active scans) to determine the available access points. In some aspects, the access terminal may use an active scan if the access terminal has information regarding the current region of operation and if regulatory restrictions allow for active scans to be supported.

In some implementations the access terminal is provisioned by the service provider (e.g., operator) with a parameter that indicates whether the access terminal is allowed to perform active scans. When the access terminal is not associated with an access point that is IEEE 802.11d-capable, then this parameter alone may dictate if active scans may be employed. When the access terminal is associated with an 802.11d-capable network, the access point may provide information regarding the current region and any regulatory restrictions. The access terminal may thus use active scans when not banned by the regulatory restrictions of the region and the service provider provisioned parameter allows for active scans.

In some implementations the access terminal may maintain a table of country/region codes and the regulatory restrictions to use during roaming. Here, the access terminal may use active scans in the designated regions where active scans are allowed. In this case, the region of operation may be determined from information obtained by the access terminal's association with a WWAN (e.g., a 3G network) or in some other manner (e.g., as discussed above).

The access terminal also may determine a permitted channel set based on the current geographic location. On the other hand, if geographic information is not available, the minimum channel set defined by 802.11d may apply. When the access terminal is not able to determine the region and determine regulatory restrictions through the mechanisms described herein or in some other way manner, active scanning may not be enabled.

The Wi-Fi search process may be initiated manually (e.g., by an event initiated by a user of the access terminal) or automatically (e.g., by system selection procedures of the access terminal). When a manual search is initiated, the access terminal scans for available access points and presents the results to the user. Typically, this scan will involve a passive scan of all the channels. In contrast, an automatic search may typically employ active scanning. FIG. 4 describes several operations that may be employed in conjunction with a manual search procedure commencing at block 402 while FIG. 5 describes several operations that may be employed in conjunction with an automatic search procedure commencing at block 502.

Referring to FIG. 4, the access terminal may determine the current scan list at block 404 (e.g., for use in active scans). As mentioned above, in some implementations the scan list may be based on SSIDs from a MRU list, SSIDs from a netlist, and a wildcard SSID. For example, the highest priority entries in the list may comprise the entries from the MRU list. SSIDs from the netlist may then make up a second priority level of entries for the scan list. In this case, the SSIDs may be added in an order based on relative priorities defined by the netlist. Here, the use of duplicate entries from the MRU list and the net list may be avoided. In addition, the scan list may include a wildcard SSID to reduce the overhead associated with active scans.

It should be appreciated that the scan list may be implemented such that successive scan procedures may scan different sets of SSIDs. For example, in some cases each scan procedure may scan each of the entries from the MRU list, and may perform a wildcard scan, but may only scan a portion of the SSIDs from the netlist. Thus, it may take several invocations of a scan procedure to scan all of the SSIDs in the scan list.

At block 406 of FIG. 4, the access terminal determines the channel scan order. This block may involve, for example, operations such as those described above in conjunction with block 308. In some aspects, the selection of a particular channel order may be based on the current deployment. For example, only a subset of the available channels may be included in the channel order list for active scans due to regulatory requirements. In other words, the channels to be scanned may depend on the geographic location of the access terminal.

At block 408, the access terminal performs a Wi-Fi scan on each channel from the channel order list. Thus, in a typical case, the access terminal successively performs a passive scan on each designated channel. As mentioned above, however, in some cases an active scan also may be employed here.

For a passive scan, the access terminal may scan each channel for a designated period of time (e.g., 120 ms). If a received beacon on that channel contains an SSID, the access terminal may store the results in the neighbor set as discussed at block 410 below.

If a received beacon does not contain an SSID, the access terminal may take a different course of action. In some cases beacons associated with a hidden SSID are simply ignored. In other cases the access terminal may use the VAPD that includes information about hidden SSID nodes to identify an associated access point. For example, a mentioned above, the VAPD may include the SSID of a hidden access point as well as information that may uniquely identify that access point (e.g., a MAC ID). In such a case, the access terminal may be able to identify a hidden access point (e.g., based on a received MAC ID). The access terminal may thus update an entry in its neighbor set for the identified access point. Conversely, if the MAC ID is not found in the VAPD, the access terminal may conduct an active scan on that channel for all SSIDs in the current scan list.

For an active scan, the access terminal may conduct a scan for all SSIDs in the current scan list at block 408. These operations may thus be similar to the operations described above in conjunction with block 310.

As represented by block 410, any results from the above scans are stored in the neighbor set, optionally ordered by SSID priority (e.g., as designated by a service provider or in some other manner). This stored information may thus include, for example, SSID, priority, basic SSID ("BSSID"), channel, and RSSI associated with a received beacon. In some cases the access terminal only adds an access point to the neighbor set if the RSSI associated with the access point (e.g., the RSSI of a received beacon) exceed a defined threshold (e.g., −95 dBm).

At block 412 of FIG. 4, the access terminal may present the results of the Wi-Fi search to the user. If the search identified any access points, the user may then elect to associate with one of these access points (e.g., if the netlist indicates that the user is authorized to access the access point). In contrast, if no access points were found at block 408, the user may elect to conduct a search at a later time.

Referring now to FIG. 5, several operations that may be employed in conjunction with an automatic search will be treated. The example of FIG. 5 relates in some aspects to operations that may be performed during an unassociated state. It should be appreciated, however, that some or all of these operations may be applicable to other states.

As represented by block 502, an automatic search may be commenced in response to an event such as an elapsed timer or a trigger event. In some cases the timer may comprise a telescopic timer. Here, the duration of the telescopic timer (i.e., the time between subsequent timed events) may change for different iterations of the timer. As a specific example, the time duration for the telescopic timer may be set to 4, 8, 32, or 96 seconds.

Blocks 502-510 relate to operations that may be iteratively performed to define (e.g., construct or update) the neighbor set. Accordingly, in at least some aspects these operations may be similar to the corresponding operations described above in conjunction with blocks 404, 406, 408, and 410 of FIG. 4. Specifically, at block 504 the access terminal determines the current scan list for the current iteration of the automatic scan operation. At block 506 the access terminal determines the channel order for the current iteration of the automatic scan operation. At block 508 the access terminal performs the current iteration of the automatic scan operation. At block 510 the access terminal defines the neighbor set based on the results of the Wi-Fi search.

As represented by block 512, at some point in time (e.g., immediately after conducting an automatic scan), the access terminal may attempt to associate with an access point that has been identified by a Wi-Fi search (e.g., added to the neighbor set). For example, at block 514 the access terminal may select an access point from the set of access points in the neighbor set that have the highest priority. Here the selected access point may be the one having the highest RSSI in the highest priority set.

At block 516 the access terminal may repeatedly monitor signals associated with that access point. In some aspects the operations of block 516 may be similar to the operations described above in conjunction with block 126. For example, the access terminal may send a directed scan at a designated intervals (e.g., every 300 ms) for a defined period of time (e.g., for two minutes).

As represented by block 518, the access terminal may filter the signaling information it receives from the designated access point to verify that the signaling from that access point consistently meets a designated criterion or criteria. Such a filter may take various forms. For example, in some cases a filtered RSSI value may be generated by an iterative formula: new filtered value=$(1-\alpha)$*current RSSI reading+$\alpha$*current filtered value. Here the value (e.g., 0.9) of the exponential averaging constant $\alpha$ may depend on the current state of the access terminal and the access point being monitored. For example, different values for $\alpha$ may be employed during WLAN acquisition (e.g., unassociated mode), during idle mode when monitoring the current access point, during idle mode when monitoring a candidate access point, during an in-traffic mode (e.g., real-time or non-real-time) when monitoring the current access point, and during an in-traffic mode when monitoring a candidate access point. Here, the value for $\alpha$ may be selected, for example, to emphasize more recent samples over older samples.

As represented by blocks 520 and 522, the access terminal may then elect to associate with the access point if the entry criterion is (or criteria are) met. For example, the access terminal may associate with the access point if the last filtered RSSI value exceeds a designated threshold (e.g., −80 dBm). The access terminal may then add this access point to the top of the MRU list.

Here, since the access terminal waits for a set period of time before associating with a found access point, there is little latency benefit in not completing the full scan once an access point on the current scan list is found. This time period may thus be used to complete the scanning on all channels in an attempt to find the best available access point.

If an entry criterion was not met at block 502, the above operations may be performed on a repeated basis until a suitable access point is found. That is, the access terminal may continue updating its neighbor list and analyzing signals it receives from any access points on that list.

Referring now to FIG. 6, several operations relating to an idle Wi-Fi state will be described. In some aspects this state may refer to procedures that an access terminal that is associated with a WLAN system undertakes in conjunction with retaining the association with an access point and performing Wi-Fi searches in an attempt to find a better access point. In particular, this state may relate to a period of time when the access terminal is associated with an access point and is currently not handling any traffic (e.g., the access terminal is not involved in active traffic exchange and thus does not have any active calls or active sockets). Here, an access terminal may be defined as not currently being in an in-traffic state if the access terminal is not sending or receiving, over a given time period, a number of packets that is greater than or equal to a threshold.

As represented by block 602, a Wi-Fi search during an idle state may commence in response to an event such as an elapsed timer or a trigger event (e.g., as discussed above in conjunction with block 502). In some cases a decision to conduct a Wi-Fi search may be gated (e.g., limited) based on certain criteria. For example, as discussed above automatic scans may be disabled or the time duration for the telescopic timer may be increased in the event the access terminal is currently associated with a designated access point (e.g., a user's home access point).

In some aspects, an important factor for idle state operations relates to reducing power consumption and, consequently, improving standby time. To this end, an access terminal may employ less frequent Wi-Fi searches during the idle state.

As represented by blocks 604 and 606, during each iteration of the idle state search, the access terminal may maintain the neighbor set as well as a candidate set to facilitate the recurring search for the best access point in the vicinity of the access terminal. Operations relating to maintaining the neighbor set may be similar to the operations described above in conjunction with FIG. 5 (e.g., at block 504-510). For these operations, the currently associated access point may be at the top of the MRU list that is used to define the current scan list (e.g., as discussed above).

As represented by block 606, the access terminal defines a candidate set to provide a ranked list of access points with which the access terminal may associate. In some cases the candidate set may consist of a set of entries from the neighbor set that are in the MRU list or the netlist (or both). For example, a candidate set may consist of the top five (i.e., highest priority) entries other than the associated access point in an ordered neighbor set. Note that in the idle state, the candidate set entries may or may not have a common SSID since traffic flow may be not negatively impacted when the access terminal switches its association to an access point having a different SSID.

In some circumstances the candidate set may be empty. This may be the case, for example, if all of the entries in the neighbor set are access points with which the access terminal cannot associate. In this case, as represented by block 608, the access terminal may reduce the current Wi-Fi search frequency (e.g., by increasing the time period of the telescopic timer). In this way, the access terminal may elect to conserve resources since there is a reduced likelihood that the Wi-Fi searches will identify any access points that are better than the currently associated access point.

As represented by blocks 610-614, the access terminal may regularly (e.g., immediately after each iteration of constructing the candidate set) determine whether it should consider associating with a different access point. Here, the access terminal may repeatedly monitor signals associated with that access point (block 612) and determine whether the exit criterion has (or criteria have) been met (block 614). In some aspects the operations of blocks 610-614 may be similar to the operations described above in conjunction with blocks 120-124.

A specific example of active access point monitoring operations follows. In this example the access terminal monitors the RSSI of the access point in conjunction with normal receive operations and stores the information in a management information base ("MIB"). The access terminal may then invoke a MIB query at regular intervals (e.g., every two seconds) to obtained a filtered RSSI value (e.g., as discussed above in conjunction with block 518). For example, the filtered RSSI value may comprise an exponential average over a given number (e.g., five) measured RSSI values.

In the event an exit criterion is not met at block 614, the access terminal maintains the current association, continues maintaining the neighbor set and candidate set, and continues monitoring its associated access point. As discussed herein, in some cases the exit criterion may relate to whether the RSSI (e.g., the filtered RSSI) of the current access point is less than or equal to a threshold level.

In the event an exit criterion is met at block 614 (e.g., as indicated by loss of association with the current access point), the access terminal may attempt to associate with the highest priority entry of the candidate set. As represented by block 616, if the candidate set is empty, the access terminal may reconstruct the neighbor set (e.g., by performing the neighbor set operations described above).

If the candidate set is not empty at block 616, the access terminal will attempt to identify the best access point in the candidate set at block 618. In addition, the access terminal may continue to maintain the candidate set. For example, at regular intervals (e.g., 120 ms) the access terminal may conduct active scans on all access points in the candidate set. At the same interval, the access terminal also may conduct active scans using the current scan list, adding one different channel each time (e.g., in a round robin manner based on the current channel ordering). For example, if candidate access points are on channels 1 and 6, a series of scans may scan channels 1, 6, and 3, then scan 1, 6, and 8, and so on. These operations also may periodically update the neighbor set.

A specific example of selecting a candidate access point at block 618 follows. As an initial criterion, the RSSI of all the candidate access point must meet or exceed a threshold (e.g., −75 dBm). As an additional criterion, the RSSI of the candidate access point having the highest RSSI must exceed a threshold based on the RSSI of the currently associated access point (e.g., exceeds the current access point RSSI by at least 10 dB). In this way, some degree of hysteresis may be added to the access point switching process to prevent the access terminal from switching too frequently. In some cases, the selection of a candidate access point is based on whether the access points support pair-wise master key ("PMK") caching or some other method of pre-sharing authentication information (e.g., keys). For example, the access terminal may try to select the candidate access point that has the highest RSSI and supports PMK caching. If no access point meets these criteria, the access terminal may select the candidate access point that has an RSSI that exceeds, by a specified amount, the RSSI of the best candidate access point that supports PMK caching (e.g., the caching-enabled access point having the highest RSSI). For example, in this case the RSSI of the non-PMK caching access point may need to exceed the RSSI of the PMK caching access point by 3 dB. In the event none of the above conditions are met, the access terminal may simply select the access point with the highest measured RSSI.

As represented by block 620, the access terminal may then repeatedly monitor signals from the selected candidate access point for a defined period of time to determine whether to associate with that access point. For example, as discussed above in conjunction with blocks 126 and 516, the access terminal may repeatedly send directed active scan probes to the selected candidate access point and verify whether the RSSI of the signals (e.g., pilots) received in response to the probes exceeds a threshold (e.g., −75 dBm).

As represented by block 622, if the criterion (or criteria) for entering into an association with the candidate access point is not met or if there is no probe response, the access terminal may select another access point from the candidate set. If none of the access points of the candidate set satisfy the entry criterions, the access terminal may retain its association with the current access point and continue to repeat the operations described above.

If the criterion (or criteria) for entering into a new association is met at block 622, the access terminal associates with the candidate access point at block 624. The above operations may then be repeated to continually maintain the candidate set and monitor signals from the currently associated access point.

In some aspects a decision to switch to another access point may depend on whether the switch will be made to an access point having a different SSID than the current access point. When switching between access points associated with the same SSID, the access terminal may autonomously perform the switching operations. When switching to an access point with a different SSID, however, a WLAN system determination component may arbitrate among the available WLAN systems based on priority in enabling such a handoff. Here, it may be up to the system determination component to choose the WLAN system with the best result based on the current pilot information provided by a WLAN call processing component.

In the event the access terminal loses WLAN coverage, the access terminal may shift to an unassociated state after a specified number of failed attempts to identify or associate with another access point. A switch to an unassociated state also may be invoked if the number of packets received over a given period of time falls below a threshold number, or if there is substantial inactivity (e.g., a relatively low number of transmitted or received packets) for a defined period of time.

Referring now to FIGS. 7 and 8, several operations relating to in-traffic Wi-Fi states will be described. In-traffic operation may be defined as two states. In one state the access terminal is handling non-real-time traffic (FIG. 7) and in the other state the access terminal is handling real-time traffic (FIG. 8). When the access terminal is handling mixed traffic types and at least one of them is a real-time traffic type, the access terminal may be deemed to be handling real-time traffic. In either case, when the access terminal conducts background scans searching for neighboring access points, the availability of the access terminal with its associated access point may be impacted. This, in turn, may negatively impact the traffic performance at the access terminal. To address this issue, the access terminal may choose appropriate time periods to tune away from its associated access point based on traffic behavior.

Referring now to FIG. 7, in some aspects the non-real-time state may refer to procedures that an access terminal undertakes when it is associated with an access point, is handling non-real-time traffic associated with that access point, and is performing Wi-Fi searches in an attempt to find a better access point. This state also may refer to the period when the access terminal is associated with an access point that supports legacy power-save mode and does not support QoS. In this case, the access terminal may not be able to distinguish between real-time and non-real-time traffic. This state also may refer to the period when the access point supports QoS and the access terminal is involved in non-real-time traffic. In some implementations, video streaming and video conferencing may be treated as non-real-time traffic since the corresponding applications may handle relatively significant delay and/or jitter. In such a case, only VoIP may be treated as real-time traffic.

In some aspects, an important factor for non-real-time state operations relates to maximizing throughput. In this state, power consumption may be less of a concern. Accordingly, an access terminal may employ more frequent, albeit more planned, Wi-Fi searches during this state.

As represented by block 702, a Wi-Fi search during a non-real-time state may commence in response to an event such as an elapsed timer or a trigger event and may be gated based on certain criteria (e.g., in a similar manner as discussed above in conjunction with block 602). Moreover, the searches conducted during in this state may be scheduled to reduce the likelihood of interruption with the transmission and reception of the non-real-time traffic.

For example, the access terminal may employ a U-APSD mode of operation or a power save mode of operation to schedule scans and thereby reduce any potential impact on data transfer. For the U-APSD mode case, the access terminal may schedule its Wi-Fi scans during time periods when the access point is queuing traffic destined for the access terminal. For the power save mode case, the access terminal may send an appropriate power save control message to its associated access point to inform the access point that the access terminal is in power save mode. As a result, the access point will stop sending data to the access terminal until the access terminal exits this mode. Consequently, the access terminal may perform its Wi-Fi searches during this power save mode period, without losing data as a result of being tuned away from its associated access point.

As represented by blocks 704 and 706, during each iteration of the non-real-time state search, the access terminal may maintain the neighbor set as well as a candidate set to facilitate the recurring search for the best access point in the vicinity of the access terminal. In some aspects, these operations may be similar to the operations described above at blocks 604 and 606. In this case, however, the access terminal may limit the candidate set to those access points that have the same SSID as the current access point. In this way, a relatively seamless transition may be made between the access points in an attempt to ensure that data traffic is not significantly impacted, if at all. In addition, the number of entries in the same candidate set may be maintained at a defined number (e.g., five) by including the highest RSSI entries from the neighbor set that have the same SSID as the current access point. In this way, the frequency with which a given candidate set access point's RSSI is measured may be increased.

As represented by block 708, the access terminal may reduce the current Wi-Fi search frequency under certain circumstances. For example, in a similar manner as discussed above at block 608, the access terminal may reduce the current Wi-Fi search frequency if the candidate set is empty or if the access terminal is associated with a particular access point (e.g., a home access point). In addition, the access terminal may reduce the current Wi-Fi search frequency if its current access point is providing a sufficiently high quality of service. Here, a high quality of service may be indicated by the RSSI (e.g., the filtered RSSI) of the access point meeting or exceed a threshold (e.g., −50 dBm).

As represented by blocks 710-714, the access terminal may regularly (e.g., immediately after each iteration of constructing the same candidate set) determine whether it should consider associating with a different access point. In a similar manner as described above in conjunction with blocks 610-614, the access terminal may repeatedly monitor signals associated with that access point (block 712) and determine whether the exit criterion has (or criteria have) been met (block 714). For example, the access terminal may periodically (e.g., every 600 ms) conduct a MIB query and obtain quality information relating to at least one link between the access terminal and the access point. Here, in some aspects an exit criterion may be based on an exponential average of the last five RSSI values. For example, an exit may be indicated if the average RSSI falls below a threshold (e.g., −80 dBm). In addition, in some aspects an exit criterion may be based on an uplink frame loss (e.g., based on a MIB variable such as a MAC retry counter, or some other suitable parameter). In this case, an exit may be indicated if the average uplink retry rate over a defined period of time (e.g., 2 seconds) is greater than or equal to a threshold amount (e.g., 5%). Here, a packet error rate ("PER") may be calculated using a filter (e.g., new filtered value=(1−α)*current PER reading+α*current filtered value).

If the candidate set is not empty at block 716, the access terminal may continue maintaining the same SSID candidate set. For example, if the average RSSI of the access points is below a designated level (e.g., −50 dBm), at regular intervals (e.g., 600 ms) the access terminal may conduct an active scan using the current SSID on one channel. The access terminal may thus cycle through all candidate access points and then one channel from the remaining set. Thus, in this case the access terminal conducts one active scan using the current SSID at a defined interval (e.g., 600 ms), independent of the number of entries in the same SSID candidate set (even if the set is empty). The maximum time between active scans to a candidate access point may thus be based on the number of candidate set entries and the interval.

If the candidate set is empty at block 716, the access terminal may construct the candidate set. For example, if the average RSSI is below a threshold level (e.g., −75 dBm), at regular intervals (e.g., 120 ms) the access terminal may conduct an active scan for the current SSID on all channels. Here, the channel order may be defined as discussed above. The access terminal may then save any results it obtains based on these scans in the same SSID candidate set (e.g., up to a maximum defined size for the candidate set).

As represented by blocks 718-724, the access terminal may associate with a new access point provided the entry criteria are met. Here, the operations of blocks 718-724 may be similar to the operations described above in conjunction with blocks 618-624.

Referring now to FIG. 8, in some aspects the real-time state may refer to procedures that an access terminal undertakes when it is associated with an access point, is handing real-time traffic associated with the current access point, and is performing Wi-Fi searches in an attempt to find a better access point. This state may refer to the period when the access point supports QoS and the access terminal is currently active for at least one application that requires real-time traffic support.

In some aspects, an important factor for the real-time state procedure involves maintaining quality of service requirements such as latency and throughput. In this state, power consumption may be less of a concern. Accordingly, an access terminal may employ more precisely scheduled Wi-Fi searches during this state.

In general, the operations of blocks 802-824 may be similar to the operations of blocks 702-724 discussed above. In this case, however, it is desirable to schedule the Wi-Fi search to avoid interrupting any real-time (e.g., periodic) data transfers. For example, for VoIP packets that are transmitted at 20 ms intervals, the Wi-Fi searches may be scheduled between the anticipated transmission times. Here, each iteration of the Wi-Fi search may last for a suitable period of time (e.g., 15 ms) that may be defined by taking into account any "timing jitter" that may be associated with the actual packet transmission times. In some implementations the Wi-Fi searches at block 802 may be scheduled using U-APSD as discussed above.

To ensure that real-time data transfers are not interrupted when an access point switch is needed, the access terminal may be more aggressive in attempting to maintain a viable candidate access point at all times. Accordingly, the access terminal may not reduce the frequency of the Wi-Fi search at block 808 (e.g., if the same SSID candidate set is empty). In addition, the access terminal may update the same SSID candidate set at more frequent intervals (e.g., 300 ms).

Also, during the real-time state the access terminal may monitor its associated access point more frequently in an attempt to ensure that traffic flow is not interrupted. For example, at block 810, the access terminal may invoke MIB queries at shorter intervals (e.g., 300 ms) than in the non-real-time state.

Furthermore, at block 812 the access terminal also may monitor downlink traffic since this information may be available from an associated VoIP application. For example, the access terminal may monitor downlink frame loss associated with the VoIP application.

At block 814 the access terminal may employ a less stringent exit criteria so that the access terminal is more likely to remain associated with its current access point (thereby reducing the number of access point switches). For example, an exit may be indicated if the average uplink retry rate over a defined period of time (e.g., 2 seconds) is greater than or equal to a relatively high threshold amount (e.g., 10%). Similarly, an exit may be indicated if the average downlink rate loss over a defined period of time (e.g., 2 seconds) is greater than or equal to a relatively high threshold amount (e.g., 10%).

As mentioned above, an access terminal as taught herein may be a multi-mode device that supports Wi-Fi and one or more other communication technologies (e.g., 3G). For example, multifunctional mobile devices may support email, Internet access, as well as traditional cellular communication. Such mobile devices may be equipped with wide area wireless connectivity, for example, utilizing the following technologies: third generation wireless or cellular systems (3G), Institute for Electrical and Electronic Engineers ("IEEE") 802.16 ("WiMax"), and other to-be-defined Wireless Wide Area Network ("WWAN") technologies. In addition, IEEE 802.11 based Wireless Local Area Network ("WLAN") connectivity may be implemented in a mobile device as well. Also, ultra-wideband ("UWB") and/or Bluetooth-based Wireless Personal Area Network ("WPAN") local connectivity may be supported by a mobile device.

Other examples of multiple communication protocols in electronic devices include a laptop that may include a WPAN utilized to connect the laptop to a wireless mouse, wireless keyboard, and the like. In addition, the laptop may include an IEEE 802.11b or 802.11g device to allow the laptop to communicate with a WLAN. WLANs may be established, for example, in enterprise environments and in homes for both personal and business purposes. In addition, WLANs may be deployed in other types of public areas and private areas.

WWAN technologies may be distinguished by wide area (ubiquitous) coverage and wide area deployments. However, these technologies may suffer from building penetration losses, coverage holes and comparatively, to WLAN and WPAN, limited bandwidth. WLAN and WPAN technologies may deliver very high data rates, approaching hundreds of Mbps, but coverage may be limited to hundreds of feet in the case of WLAN and tens of feet in the case of WPAN.

In a sample deployment, a WLAN may be associated with a wired local area network ("LAN"). Here, an access point may be in communication with one more mobile devices and may be connected to an Ethernet hub or switch for the LAN. The Ethernet hub may be connected to a router that transmits data packets to a modem that is connected to a wide area network ("WAN"), such as the Internet.

A mobile device may support seamless switching from an access point that is currently being utilized by the mobile device to another access point. In some cases, such a transfer to another access point and to the network supported by that access point may be invoked to provide a user of the mobile device a sought after functionality. Such a transfer also may be a function of the location of the mobile device and/or the data the user desires to access or upload to mobile device. By way of example and not limitation, the mobile device may be coupled to other electronic device(s) to utilize WWAN and/or WLAN functionality available through the electronic device (s). Such a transition can be user initiated or performed autonomously by the mobile device.

In some aspects, a mobile device may include a WWAN component that provides WWAN functionality and a WLAN component that provides WLAN functionality. The components may be located together and adapted to communicate via one or more associated transceivers. In some cases, the WLAN component may handle voice traffic that is routed through the transceiver(s). In some implementations the WWAN component and/or the WLAN component may be implemented in a processor of the mobile device. In another aspect, WWAN functionality and WLAN functionality may be provided by distinct integrated circuits. The mobile device may connect to either the WWAN or the WLAN, or to both simultaneously, based upon one or more criteria that relates to functions of the mobile device. Further, processes and criteria for switching between each of the networks and/or protocols may also be provided. The criteria may be stored in a memory of the mobile device and a processor may analyze a network based on the stored criteria.

Figure 9:
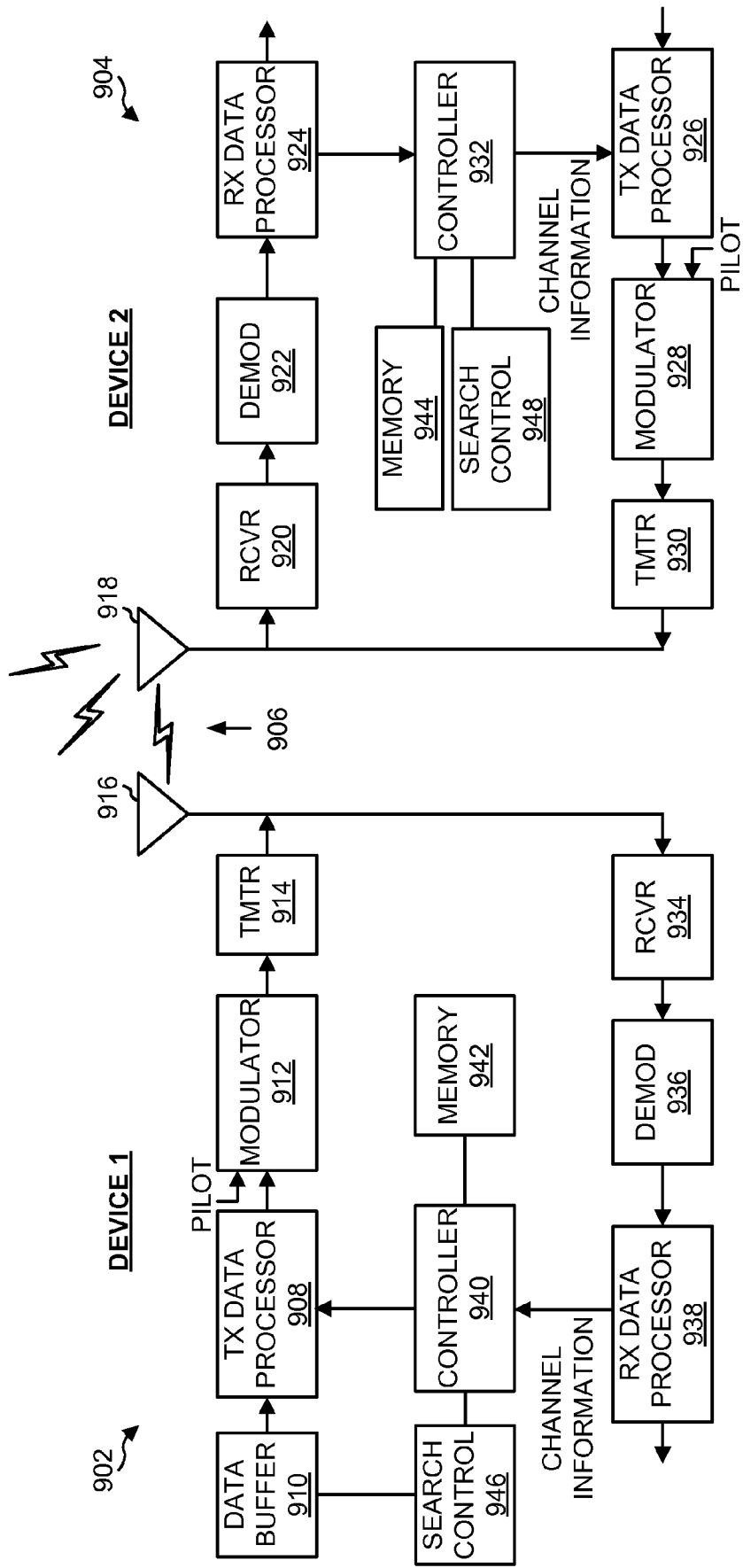
FIG. 9 is a simplified block diagram of several sample aspects of communication components.

The teachings herein may be incorporated into a device employing various components for communicating with at least one other wireless device. FIG. 9 depicts several sample components that may be employed to facilitate communication between devices. Here, a first device 902 (e.g., an access terminal) and a second device 904 (e.g., an access point) are adapted to communicate via a wireless communication link 906 over a suitable medium.

Initially, components involved in sending information from the device 902 to the device 904 (e.g., a reverse link) will be treated. A transmit ("TX") data processor 908 receives traffic data (e.g., data packets) from a data buffer 910 or some other suitable component. The transmit data processor 908 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 912 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 914 processes (e.g., converts to analog, filters, amplifies, and frequency upconverts) the output chip stream and generates a modulated signal, which is then transmitted from an antenna 916.

The modulated signals transmitted by the device 902 (along with signals from other devices in communication with the device 904) are received by an antenna 918 of the device 904. A receiver ("RCVR") 920 processes (e.g., conditions and digitizes) the received signal from the antenna 918 and provides received samples. A demodulator ("DEMOD") 922 processes (e.g., demodulates and detects) the received samples and provides detected data symbols, which may be a noisy estimate of the data symbols transmitted to the device 904 by the other device(s). A receive ("RX") data processor 924 processes (e.g., symbol demaps, deinterleaves, and decodes) the detected data symbols and provides decoded data associated with each transmitting device (e.g., device 902).

Components involved in sending information from the device 904 to the device 902 (e.g., a forward link) will be now be treated. At the device 904, traffic data is processed by a transmit ("TX") data processor 926 to generate data symbols. A modulator 928 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 930 and transmitted from the antenna 918. In some implementations signaling for the forward link may include power control commands and other information (e.g., relating to a communication channel) generated by a controller 932 for all devices (e.g. terminals) transmitting on the reverse link to the device 904.

At the device 902, the modulated signal transmitted by the device 904 is received by the antenna 916, conditioned and digitized by a receiver ("RCVR") 934, and processed by a demodulator ("DEMOD") 936 to obtain detected data symbols. A receive ("RX") data processor 938 processes the detected data symbols and provides decoded data for the device 902 and the forward link signaling. A controller 940 receives power control commands and other information to control data transmission and to control transmit power on the reverse link to the device 904.

The controllers 940 and 932 direct various operations of the device 902 and the device 904, respectively. For example, a controller may determine an appropriate filter, reporting information about the filter, and decode information using a filter. Data memories 942 and 944 may store program codes and data used by the controllers 940 and 932, respectively.

FIG. 9 also illustrates that the communication components may include one or more components that perform search operations as taught herein. For example, a search control component 946 may cooperate with the controller 940 and/or other components of the device 902 to conduct searches and perform related operations as taught herein. Similarly, a search control component 948 may cooperate with the controller 932 and/or other components of the device 904 to send and receive signals to another device (e.g., device 902) to facilitate discovery of the device 902 by the device 904.

The teachings herein may be incorporated into (e.g., implemented within or performed by) a variety of apparatuses (e.g., devices). For example, a wireless device may be configured or referred to as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Other wireless devices (e.g., wireless terminals) may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless device may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless device may communicate via one or more wireless communication links that are based on or otherwise support any suitable wireless communication technology. For example, in some aspects a wireless device may associate with a network. In some aspects the network may comprise a body area network or a personal area network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver (e.g., transceiver 242 with associated transmitter and receiver components (e.g., transmitter 244 and receiver 246) that may include various components (e.g., signal generators and signal processors) that facilitate communication over a wireless medium.

The components described herein may be implemented in a variety of ways. Referring to FIGS. 10 and 11, apparatuses 1000 and 1100 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 10 and 11 may be optional.

The apparatuses 1000 and 1100 may include one or more modules that may perform one or more of the functions described above with regard to various figures. For example, a state identifying means 1002 may correspond to, for example, a state controller as discussed herein. A search procedure identifying means 1004 may correspond to, for example, a search procedure identifier as discussed herein. A search procedure using means 1006 may correspond to, for example, a search controller as discussed herein. An information maintaining means 1008 or 1110 may correspond to, for example, a database manager as discussed herein. A location determining means 1010 or 1106 may correspond to, for example, a location determiner as discussed herein. An association determining means 1012 or 1108 may correspond to, for example, a communication processor as discussed herein. An access point identifying means 1014 or 1104 may correspond to, for example, an access point selector as discussed herein. A transmission monitoring means 1016 or 1112 may correspond to, for example, a signal/traffic monitor as discussed herein. A searching means 1018 may correspond to, for example, a search controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication wherein different search procedures are employed for different wireless communication traffic states of a wireless node, the method comprising:
    identifying a current wireless communication traffic state of a wireless node, wherein the identification of the current wireless communication traffic state comprises determining which operational state, of a plurality of defined wireless communication traffic states, has been invoked by the wireless node;

identifying which search procedure of a plurality of different types of search procedures is associated with the current wireless communication traffic state, wherein, for each of the different types of search procedures, the corresponding type of search procedure is defined for use during a corresponding one of the defined wireless communication traffic states, and wherein the identification of the search procedure comprises determining how frequently searches are to be conducted during the identified wireless communication traffic state; and using the identified search procedure to search for access points during the identified wireless communication traffic state.

2. The method of claim 1, wherein the identification of the current wireless communication traffic state comprise determining whether the wireless node is in an unassociated state, an idle state, a non-real-time traffic state, or a real-time traffic state.

3. The method of claim 1, wherein different optimization criteria are associated with different states of the plurality of wireless communication traffic states.

4. The method of claim 3, wherein the different optimization criteria relate to reducing power consumption of the wireless node, facilitating throughput by the wireless node, and meeting latency requirements at the wireless node.

5. The method of claim 1, further comprising:
determining a location of the wireless node; and
limiting the search for access points based on the determined location.

6. The method of claim 5, wherein the location of the wireless node comprises a country within which the wireless node is located.

7. The method of claim 1, further comprising:
determining whether the wireless node is associated with a specified access point; and
limiting the search for access points based on the determination.

8. The method of claim 1, wherein the search for the access points is conducted according to a prioritized channel search order.

9. The method of claim 1, wherein the identified search procedure comprises adjusting how frequently access point scans are conducted based on at least one characteristic of a signal received from an access point that is associated with the wireless node.

10. The method of claim 1, wherein the identified search procedure comprises adjusting how frequently access point scans are conducted based on whether a previous access point scan detected at least one neighboring access point.

11. The method of claim 1, wherein the identified search procedure comprises adjusting how frequently access point scans are conducted based on whether a previous access point scan identified a neighboring access point having an SSID that is the same as an SSID of an access point that is currently associated with the wireless node.

12. The method of claim 1, wherein the identified search procedure comprises scheduling access point scans between transmission and/or reception of real-time traffic.

13. The method of claim 1, wherein the search for access points and/or a previous search for access points identified a plurality of access points, the method further comprising:
identifying a candidate access point from the identified access points; and
monitoring transmissions from the candidate access point over a defined period of time to determine whether to associate with the candidate access point.

14. The method of claim 1, wherein the search for access points identified a plurality of access points, the method further comprising:
maintaining information regarding interactions of the wireless node with the identified access points; and
determining whether to associate with one of the identified access points based on the maintained information.

15. The method of claim 1, further comprising determining whether to associate with one of the identified access points based on at least one characteristic of a communication link established between the wireless node and an access point that is associated with the wireless node.

16. An apparatus for wireless communication wherein different search procedures are employed for different wireless communication traffic states of a wireless node, the apparatus comprising:
a state controller adapted to identify a current wireless communication traffic state of a wireless node, wherein the identification of the current wireless communication traffic state comprises determining which operational state, of a plurality of defined wireless communication traffic states, has been invoked by the wireless node;
a search procedure identifier adapted to identify which search procedure of a plurality of different types of search procedures is associated with the current wireless communication traffic state, wherein, for each of the different types of search procedures, the corresponding type of search procedure is defined for use during a corresponding one of the defined wireless communication traffic states, and wherein the identification of the search procedure comprises determining how frequently searches are to be conducted during the identified wireless communication traffic state; and
a search controller adapted to use the identified search procedure to search for access points during the identified current wireless communication traffic state.

17. The apparatus of claim 16, wherein the state controller is further adapted to determine whether the wireless node is in an unassociated state, an idle state, a non-real-time traffic state, or a real-time traffic state.

18. The apparatus of claim 16, wherein different optimization criteria are associated with different states of the plurality of wireless communication traffic states.

19. The apparatus of claim 18, wherein the different optimization criteria relate to reducing power consumption of the wireless node, facilitating throughput by the wireless node, and meeting latency requirements at the wireless node.

20. The apparatus of claim 16, further comprising a location determiner adapted to determine a location of the wireless node, wherein the search controller is further adapted to limit the search for access points based on the determined location.

21. The apparatus of claim 16, further comprising a communication processor adapted to determine whether the wireless node is associated with a specified access point, wherein the search controller is further adapted to limit the search for access points based on the determination.

22. The apparatus of claim 16, wherein the search controller is further adapted to conduct the search for the access points according to a prioritized channel search order.

23. The apparatus of claim 16, wherein the search for access points and/or a previous search for access points identified a plurality of access points, the apparatus further comprising:
an access point selector adapted to identify a candidate access point from the identified access points; and a traffic monitor adapted to monitor transmissions from the candidate access point over a defined period of time to determine whether to associate with the candidate access point.

24. The apparatus of claim 16, wherein the search for access points identified a plurality of access points, the apparatus further comprising:
a database manager adapted to maintain information regarding interactions of the wireless node with the identified access points; and
an access point selector adapted to determine whether to associate with one of the identified access points based on the maintained information.

25. An apparatus for wireless communication wherein different search procedures are employed for different wireless communication traffic states of a wireless node, the apparatus comprising:
means for identifying a current wireless communication traffic state of a wireless node, wherein the identification of the current wireless communication traffic state comprises determining which operational state, of a plurality of defined wireless communication traffic states, has been invoked by the wireless node;
means for identifying which search procedure of a plurality of different types of search procedures is associated with the current wireless communication traffic state, wherein, for each of the different types of search procedures, the corresponding type of search procedure is defined for use during a corresponding one of the defined wireless communication traffic states, and wherein the identification of the search procedure comprises determining how frequently searches are to be conducted during the identified wireless communication traffic state; and
means for using the identified search procedure to search for access points during the identified wireless communication traffic state.

26. The apparatus of claim 25, wherein the means for identifying a current wireless communication traffic state determines whether the wireless node is in an unassociated state, an idle state, a non-real-time traffic state, or a real-time traffic state.

27. The apparatus of claim 25, wherein different optimization criteria are associated with different states of the plurality of wireless communication traffic states.

28. The apparatus of claim 27, wherein the different optimization criteria relate to reducing power consumption of the wireless node, facilitating throughput by the wireless node, and meeting latency requirements at the wireless node.

29. The apparatus of claim 25, further comprising means for determining a location of the wireless node, wherein the means for using limits the search for access points based on the determined location.

30. The apparatus of claim 25, further comprising means for determining whether the wireless node is associated with a specified access point, wherein the means for using limits the search for access points based on the determination.

31. The apparatus of claim 25, wherein the means for using conducts the search for the access points according to a prioritized channel search order.

32. The apparatus of claim 25, wherein the search for access points and/or a previous search for access points identified a plurality of access points, the apparatus further comprising:
means for identifying a candidate access point from the identified access points; and
means for monitoring transmissions from the candidate access point over a defined period of time to determine whether to associate with the candidate access point.

33. The apparatus of claim 25, wherein the search for access points identified a plurality of access points, the apparatus further comprising:
means for maintaining information regarding interactions of the wireless node with the identified access points; and
means for determining whether to associate with one of the identified access points based on the maintained information.

34. A computer-program product for wireless communication wherein different search procedures are employed for different wireless communication traffic states of a wireless node, the product comprising:
a non-transitory computer-readable medium comprising code for causing a computer to:
identify a current wireless communication traffic state of a wireless node, wherein the identification of the current wireless communication traffic state comprises determining which operational state, of a plurality of defined wireless communication traffic states, has been invoked by the wireless node;
identify which search procedure of a plurality of different types of search procedures is associated with the current wireless communication traffic state, wherein, for each of the different types of search procedures, the corresponding type of search procedure is defined for use during a corresponding one of the defined wireless communication traffic states, and wherein the identification of the search procedure comprises determining how frequently searches are to be conducted during the identified wireless communication traffic state; and
use the identified search procedure to search for access points during the identified current wireless communication traffic state.

35. The computer-program product of claim 34, wherein the computer-readable medium further comprises code for causing the computer to determine whether the wireless node is in an unassociated state, an idle state, a non-real-time traffic state, or a real-time traffic state.

36. The computer-program product of claim 34, wherein different optimization criteria are associated with different states of the plurality of wireless communication traffic states.

37. The computer-program product of claim 36, wherein the different optimization criteria relate to reducing power consumption of the wireless node, facilitating throughput by the wireless node, and meeting latency requirements at the wireless node.

38. The computer-program product of claim 34, wherein the computer-readable medium further comprises code for causing the computer to:
determine a location of the wireless node; and
limit the search for access points based on the determined location.

39. The computer-program product of claim 34, wherein the computer-readable medium further comprises code for causing the computer to:
determine whether the wireless node is associated with a specified access point; and
limit the search for access points based on the determination.

40. The computer-program product of claim 34, wherein the computer-readable medium further comprises code for causing the computer to conduct the search for the access points according to a prioritized channel search order.

41. The computer-program product of claim 34, wherein the search for access points and/or a previous search for access points identified a plurality of access points, and wherein the computer-readable medium further comprises code for causing the computer to:
identify a candidate access point from the identified access points; and
monitor transmissions from the candidate access point over a defined period of time to determine whether to associate with the candidate access point.

42. The computer-program product of claim 34, wherein the search for access points identified a plurality of access points, and wherein the computer-readable medium further comprises code for causing the computer to:
maintain information regarding interactions of the wireless node with the identified access points; and
determine whether to associate with one of the identified access points based on the maintained information.

43. A method of wireless communication, comprising:
determining at least one current signal quality characteristic of a communication link between a first access point and a wireless node that is associated with the first access point;
identifying which search procedure of a plurality of different types of search procedures is associated with the current signal quality characteristic, wherein, for each of the different types of search procedures, the corresponding type of search procedure is defined for use for a current signal quality characteristic, and wherein the identification of the search procedure comprises determining how frequently searches are to be conducted for the identified current signal quality characteristic;
conducting the search procedure for access points based on the determination of how frequently the wireless node is to conduct the search; and
identifying, based on the search procedure for access points, a candidate access point with which the wireless node may associate in the event the wireless node ends its association with the first access point.

44. The method of claim 43, further comprising:
determining a location of the wireless node; and
limiting the search for access points based on the determined location.

45. The method of claim 44, wherein the location of the wireless node comprises a country within which the wireless node is located.

46. The method of claim 43, further comprising:
determining whether the wireless node is associated with a specified access point; and
limiting the search procedure for access points based on the determination.

47. The method of claim 43, wherein the search procedure for access points is conducted according to a prioritized channel search order.

48. The method of claim 43, wherein the search procedure for access points comprises adjusting how frequently access point scans are conducted based on whether a previous access point scan detected at least one neighboring access point.

49. The method of claim 43, wherein the search procedure for access points comprises adjusting how frequently access point scans are conducted based on whether a previous access point scan identified a neighboring access point having an SSID that is the same as an SSID of the first access point.

50. The method of claim 43, wherein the search procedure for access points comprises adjusting how frequently access point scans are conducted based on quality of service provided by the first access point.

51. The method of claim 43, further comprising:
maintaining access point information acquired during the search procedure for access points and/or acquired during a prior search procedure for access points; and
determining whether to associate with the candidate access point based on the maintained information.

52. The method of claim 51, wherein the maintained information relates to interactions of the wireless node with a plurality of access points.

53. The method of claim 52, wherein the maintained information identifies access points the wireless node has used most recently.

54. The method of claim 51, wherein the maintained information identifies any access points that have an SSID that is the same as an SSID of the first access point.

55. The method of claim 43, wherein the identification of the candidate access point comprises determining whether RSSI of a signal from the candidate access point exceeds a threshold.

56. The method of claim 43, wherein the identification of the candidate access point comprises determining whether the candidate access point has an SSID that is the same as an SSID of the first access point.

57. The method of claim 43, further comprising monitoring transmissions from the candidate access point over a defined period of time to determine whether to associate with the candidate access point.

58. The method of claim 57, further comprising sending directed scans to the candidate access point during the defined period of time.

59. The method of claim 43, further comprising determining whether to associate with the candidate access point based on at least one other characteristic of the communication link between the wireless node and the first access point.

60. The method of claim 59, wherein the at least one other characteristic of the communication link comprises RSSI of a signal received from the first access point.

61. The method of claim 43, further comprising determining whether to associate with the candidate access point based on whether communication with the first access point has deteriorated.

62. An apparatus for wireless communication, comprising:
a search controller adapted to determine at least one current signal quality characteristic of a communication link between a first access point and a wireless node that is associated with the first access point, adapted to identify which search procedure of a plurality of different types of search procedures is associated with the current signal quality characteristic, wherein, for each of the different types of search procedures, the corresponding type of search procedure is defined for use for a current signal quality characteristic, further adapted to determine how frequently the wireless node is to conduct a search for access points based on the determined at least one current signal quality characteristic, and further adapted to conduct the search procedure for access points based on the determination of how frequently the wireless node is to conduct the search; and
an access point selector adapted to identify, based on the search procedure, a candidate access point with which the wireless node may associate in the event the wireless node ends its association with the first access point.

63. The apparatus of claim 62, further comprising a location determiner adapted to determine a location of the wireless node, wherein the search controller is further adapted to limit the search procedure for access points based on the determined location.

64. The apparatus of claim 62, further comprising a communication processor adapted to determine whether the wireless node is associated with a specified access point, wherein the search controller is further adapted to limit the search procedure for access points based on the determination.

65. The apparatus of claim 62, wherein the search controller is further adapted to conduct the search procedure for access points according to a prioritized channel search order.

66. The apparatus of claim 62, further comprising:
a database manager adapted to maintain access point information acquired during the search procedure for access points and/or acquired during a prior search for access points; and
an access point selector adapted to determine whether to associate with the candidate access point based on the maintained information.

67. The apparatus of claim 66, wherein the maintained information relates to interactions of the wireless node with a plurality of access points.

68. The apparatus of claim 67, wherein the maintained information identifies access points the wireless node has used most recently.

69. The apparatus of claim 62, wherein the identification of the candidate access point comprises determining whether RSSI of a signal from the candidate access point exceeds a threshold.

70. The apparatus of claim 62, wherein the identification of the candidate access point comprises determining whether the candidate access point has an SSID that is the same as an SSID of the first access point.

71. The apparatus of claim 62, further comprising a traffic monitor adapted to monitor transmissions from the candidate access point over a defined period of time to determine whether to associate with the candidate access point.

72. The apparatus of claim 62, further comprising an access point selector adapted to determine whether to associate with the candidate access point based on whether communication with the first access point has deteriorated.

73. An apparatus for wireless communication, comprising:
means for determining at least one current signal quality characteristic of a communication link between a first access point and a wireless node that is associated with the first access point;
means for identifying which search procedure of a plurality of different types of search procedures is associated with the current signal quality characteristic, wherein, for each of the different types of search procedures, the corresponding type of search procedure is defined for use for a current signal quality characteristic;
means for determining how frequently the wireless node is to conduct a search procedure for access points based on the determined at least one current signal quality characteristic;
means for conducting the search procedure for access points based on the determination of how frequently the wireless node is to conduct the search procedure; and
means for identifying, based on the search procedure, a candidate access point with which the wireless node may associate in the event the wireless node ends its association with the first access point.

74. The apparatus of claim 73, further comprising means for determining a location of the wireless node, wherein the means for searching limits the search procedure for access points based on the determined location.

75. The apparatus of claim 73, further comprising means for determining whether the wireless node is associated with a specified access point, wherein the means for searching limits the search procedure for access points based on the determination.

76. The apparatus of claim 73, wherein the means for searching conducts the search procedure for access points according to a prioritized channel search order.

77. The apparatus of claim 73, further comprising:
means for maintaining access point information acquired during the search procedure for access points and/or acquired during a prior search for access points; and
means for determining whether to associate with the candidate access point based on the maintained information.

78. The apparatus of claim 77, wherein the maintained information relates to interactions of the wireless node with a plurality of access points.

79. The apparatus of claim 78, wherein the maintained information identifies access points the wireless node has used most recently.

80. The apparatus of claim 73, wherein the identification of the candidate access point comprises determining whether RSSI of a signal from the candidate access point exceeds a threshold.

81. The apparatus of claim 73, wherein the identification of the candidate access point comprises determining whether the candidate access point has an SSID that is the same as an SSID of the first access point.

82. The apparatus of claim 73, further comprising means for monitoring transmissions from the candidate access point over a defined period of time to determine whether to associate with the candidate access point.

83. The apparatus of claim 73, further comprising means for determining whether to associate with the candidate access point based on whether communication with the first access point has deteriorated.

84. A computer-program product for wireless communication, comprising:
a non-transitory computer-readable medium comprising code for causing a computer to:
determine at least one current signal quality characteristic of a communication link between a first access point and a wireless node that is associated with the first access point;
identify which search procedure of a plurality of different types of search procedures is associated with the current signal quality characteristic, wherein, for each of the different types of search procedures, the corresponding type of search procedure is defined for use for a current signal quality characteristic;
determine how frequently the wireless node is to conduct a search procedure for access points based on the determined at least one current signal quality characteristic;
conduct the search procedure for access points based on the determination of how frequently the wireless node is to conduct the search; and
identify, based on the search procedure, a candidate access point with which the wireless node may associate in the event the wireless node ends its association with the first access point.

85. The computer-program product of claim 84, wherein the computer-readable medium further comprises code for causing the computer to:
determine a location of the wireless node; and limit the search procedure for access points based on the determined location.

86. The computer-program product of claim 84, wherein the computer-readable medium further comprises code for causing the computer to:
  determine whether the wireless node is associated with a specified access point; and
  limit the search procedure for access points based on the determination.

87. The computer-program product of claim 84, wherein the computer-readable medium further comprises code for causing the computer to conduct the search procedure for access points according to a prioritized channel search order.

88. The computer-program product of claim 84, wherein the computer-readable medium further comprises code for causing the computer to:
  maintain access point information acquired during the search for access points and/or acquired during a prior search for access points; and
  determine whether to associate with the candidate access point based on the maintained information.

89. The computer-program product of claim 88, wherein the maintained information relates to interactions of the wireless node with a plurality of access points.

90. The computer-program product of claim 89, wherein the maintained information identifies access points the wireless node has used most recently.

91. The computer-program product of claim 84, wherein the identification of the candidate access point comprises determining whether RSSI of a signal from the candidate access point exceeds a threshold.

92. The computer-program product of claim 84, wherein the identification of the candidate access point comprises determining whether the candidate access point has an SSID that is the same as an SSID of the first access point.

93. The computer-program product of claim 84, wherein the computer-readable medium further comprises code for causing the computer to monitor transmissions from the candidate access point over a defined period of time to determine whether to associate with the candidate access point.

94. The computer-program product of claim 84, wherein the computer-readable medium further comprises code for causing the computer to determine whether to associate with the candidate access point based on whether communication with the first access point has deteriorated.

95. The method of claim 43, wherein the at least one current characteristic indicates quality of the communication link.

96. The apparatus of claim 62, wherein the at least one current characteristic indicates quality of the communication link.

* * * * *